US007581342B2

(12) United States Patent
Egami et al.

(10) Patent No.: US 7,581,342 B2
(45) Date of Patent: Sep. 1, 2009

(54) DISPLAY DEVICE

(75) Inventors: Shigeru Egami, Tokyo (JP); Kazuo Arai, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 440 days.

(21) Appl. No.: 11/506,203

(22) Filed: Aug. 18, 2006

(65) Prior Publication Data

US 2007/0047215 A1 Mar. 1, 2007

(30) Foreign Application Priority Data

Aug. 24, 2005 (JP) ............................. 2005-242015
Dec. 16, 2005 (JP) ............................. 2005-362530

(51) Int. Cl.

| | |
|---|---|
| ***G09F 13/00*** | (2006.01) |
| ***G09F 19/00*** | (2006.01) |
| ***B60Q 1/26*** | (2006.01) |
| ***F21V 9/00*** | (2006.01) |
| ***F21V 11/00*** | (2006.01) |
| ***G01D 11/28*** | (2006.01) |
| ***G09F 9/00*** | (2006.01) |
| ***G09F 13/12*** | (2006.01) |
| ***G08B 5/00*** | (2006.01) |
| ***G08B 5/36*** | (2006.01) |

(52) U.S. Cl. ........................... 40/444; 40/441; 362/227; 362/230; 362/231; 362/240; 362/29; 362/30; 362/293; 340/815.44; 340/815.45; 340/815.53; 340/815.55; 340/815.56; 340/815.57; 340/815.65; 340/815.66; 340/815.73; 340/815.74; 340/815.75; 340/815.76

(58) Field of Classification Search ................... 40/441, 40/444; 362/227, 230, 231, 240, 29, 30, 362/293; 340/815.44, 815.45, 815.53, 815.55–57, 340/815.65–66, 815.73–76
See application file for complete search history.

(56) References Cited

U.S. PATENT DOCUMENTS 7,406,785 B2 * 8/2008 Noguchi ...................... 40/442

FOREIGN PATENT DOCUMENTS

JP 2001-100679 A 4/2001

* cited by examiner

*Primary Examiner*—Lesley D Morris
*Assistant Examiner*—Syed A Islam
(74) *Attorney, Agent, or Firm*—Foley & Lardner LLP

(57) ABSTRACT

A display device includes an ultraviolet light source, a color light source, and a filter selectively hit by their lights. The filter has a first area part for displaying the first display contents excluding an overlapped parts when the ultraviolet light is emitted, a second area part for the second display contents excluding the overlapped parts when the color light is emitted, and a third display part for displaying the overlapped parts when one of the ultraviolet and color light is emitted. The first area part blocks the color light and produces visible light when the ultraviolet light hits the first area part, the second area part allows the ultraviolet and color lights to pass therethrough, and the third area part allows the ultraviolet and color lights to pass therethrough and produces the visible light when the ultraviolet light hits the third area part.

19 Claims, 19 Drawing Sheets

DISPLAY DEVICE

BACKGROUND OF THE INVENTION

1. Field of the Invention

The present invention relates to a display device that is capable of shifting display contents having different colors and an overlapped part thereof.

2. Description of the Related Art

A display device of this kind is disclosed in Japanese patent laying-open publication No. 2001-100679. This display device has a first printed area part through which only blue light can pass and a second printed area part through which only green light can pass, the other printed area part to form a lightproof background, and a non-printed area part through which the blue light and the green light can pass. The first, second printed area parts and the other printed area part are formed by printing on a rear surface of a transparent sheet, which can be illuminated from a rear side thereof selectively by a first light source for emitting the blue light and a second light source for emitting the green light. When the first light source emits the blue light, it pass through the first printed area part and the non-printed area part, being cut off at the second printed area part and other printed area part, to form first display contents. When the second light source emits the green light, it pass through the second printed area part and the non-printed area part, being cut off at the first printed area part and other printed area part, to form second display contents. The non-printed area part correspond to an overlapping part of the first display contents and the second display contents.

The above known conventional display device, however, encounters a problem in that kinds of colors to display the display contents are limited by wavelength characteristics of two color films, that is the first and second printed area parts. This decreases freedom of choice in selecting color of display contents, for example, display contents displayed in white being unobtainable.

It is, therefore, an object of the present invention to provide a display device which overcomes the foregoing drawbacks and can extend a limitation due to the wavelength characteristics of a color film of a filter and obtain more colors for displaying display contents.

SUMMARY OF THE INVENTION

According to a first aspect of the present invention there is provided a display device that is capable of selectively displaying first display contents and second display contents where the first display contents and the second display contents have first overlapped parts overlapped with each other. The display device includes an ultraviolet light source for emitting ultraviolet light, a color light source for emitting color light, and a filter that is arranged in front of the ultraviolet and color light sources so that a rear surface of the filter can be selectively hit by the ultraviolet light and the color light. The filter has a first area part for displaying the first display contents excluding the first overlapped parts when the ultraviolet light is emitted, a second area part for the second display contents excluding the first overlapped parts when the color light is emitted, and a third area part for displaying the first overlapped parts when one of the ultraviolet light and the color light is emitted. The first area part blocks the color light and produces visible light when the ultraviolet light hits the first area part, the second area part allows the ultraviolet light and the color light to pass therethrough, and the third area part allows the ultraviolet light and the color light to pass therethrough and produces the visible light when the ultraviolet light hits the third area part.

Therefore, this display device can extend a limitation due to the wavelength characteristics of a color film and obtain more colors for displaying display contents. The display device can appear display contents in color different from that of the color film, including white.

Preferably, the display device has at least the first area part and the third area part are made by printing.

Therefore, these area parts can be made at low manufacturing costs.

Preferably, the first area part is made of a color filter that blocks the color light and allows the ultraviolet light to pass therethrough and an ultraviolet filter that is arranged in front of the color filter to allow the color light to pass therethrough and produce the visible light when the ultraviolet light hits the ultraviolet filter. The second area part is made of a transparent filter allowing the ultraviolet light and the color light to pass therethrough. The third area part is made of the ultraviolet filter and the transparent filter which are overlapped with each other.

Therefore, the display device can easily display two display contents, which have the overlapped parts, in different colors including a color different from that of the filter.

Preferably, the color light source has a first color light source for emitting first color light and a second color light source for emitting second color light different from the first color light. The second area part is constructed to be capable of selectively displaying third display contents and fourth display contents which are included in the second display contents to have a fourth area part for displaying the third display contents excluding a second overlapped parts of the third and fourth display contents when the first color light is emitted, a fifth area part for displaying the fourth display contents excluding the second overlapped parts when the second color light is emitted, and a sixth area part for displaying a second overlapped display part when one of the first color light and the second color light is emitted. The fourth area part is made of a first color filter that allows the first color light to pass therethrough and blocks the second color light, the fifth area part is made of a second color filter that allows the second color light therethrough and blocks the first color light, and the sixth area part is made of a transparent filter that allows the first and second color lights to pass therethrough.

Therefore, the display device can easily display three display contents, which have the overlapped parts, in different colors including a color different from that of the filter. These three display contents can be displayed in three colors or two colors by changing fluorescent material, extending the limitation to colors.

Preferably, the display device further has a smoke area part arranged in front of the filter so that the smoke area part suppresses brightness of the light.

This prevents an interior parts of the display device from being clearly seen from an exterior thereof, improving visual quality.

Preferably, the display device further has an ultraviolet light cut area part arranged in front of the filter or between the smoked lens and the filter.

This prevents an interior parts of the display device from being clearly seen from an exterior thereof and effects on display of the display contents due to the ultraviolet light incoming from the exterior, improving visual quality.

Preferably, the ultraviolet light cut area part is made by printing.

The ultraviolet light cut area part can be made at low manufacturing costs.

BRIEF DESCRIPTION OF THE DRAWINGS

The objects, features and advantages of the present invention will become apparent as the description proceeds when taken in conjunction with the accompanying drawings, in which:

FIGS. 20G to 20I are diagrams showing them in red, blue and yellow, respectively; and FIGS. 21A to 21I are diagrams showing display contents when the display device of the second embodiment is applied to an audio device, wherein FIGS. 21A to 21C show diagrams showing three display contents "TUNE", "CD" and "DVD2, having different contents, displayed in red, blue and white, respectively, FIGS. 21D to 21F are diagrams showing three display contents "FM", "CD" and "AM", two of them having contents similar to each other, displayed in red, blue and red, respectively, and FIGS. 21G to 21I are diagrams showing three display contents, different from one another, displayed in red, blue and yellow, respectively.

DETAILED DESCRIPTION OF THE PREFERRED EMBODIMENTS

Figure 1:
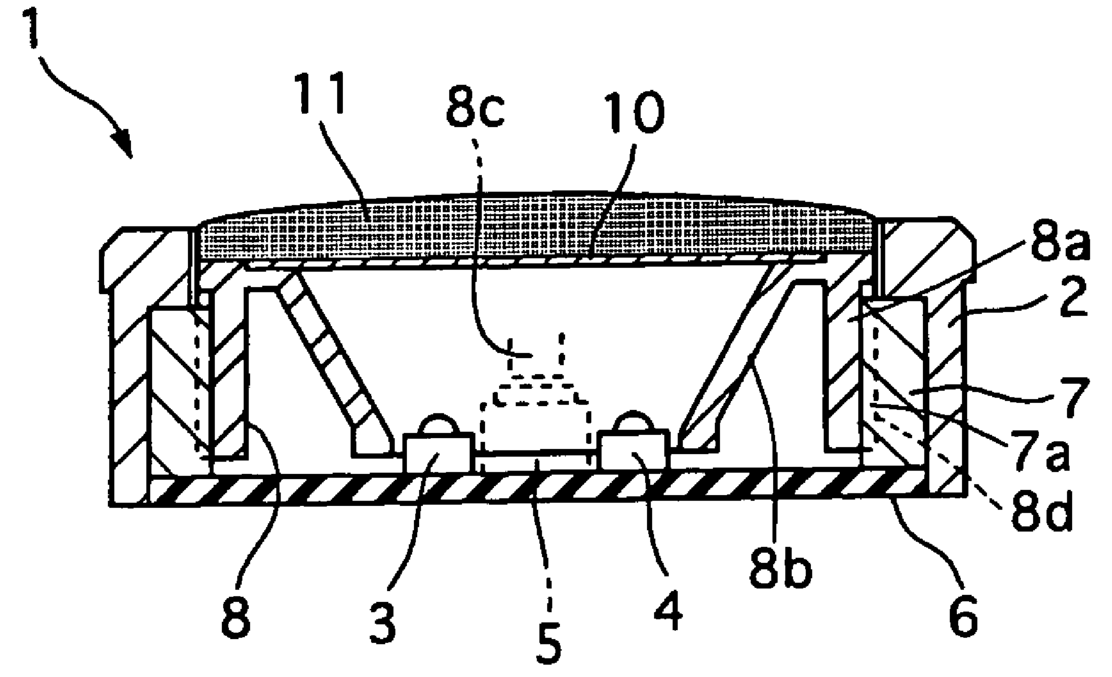
FIG. 1 is a cross sectional side view showing a switch with a display device of a first embodiment according to the present invention.

Throughout the following detailed description, similar reference characters and numbers refer to similar elements in all figures of the drawings, and their descriptions are omitted for eliminating duplication.

Referring to FIGS. 1 to 8, there is shown a display device of a first preferred embodiment according to the present invention. In this embodiment, a switch 1 has the display device capable of providing two display characters having colors different from each other.

The switch 1 has a switch finisher 2, a guide member 7 fixed to a lower and inner portion of the switch finisher 2, and a slider 8 arranged inside of the switch finisher 2 and capable of sliding rearward and forward, corresponding to downward and upward in FIG. 1, respectively.

The switch finisher 2 is shaped like a square-tube, and contains the guide member 7 which is also shaped like a square-tube set smaller than the switch finisher 2 so as to be fixable to the inner portion of the switch finisher 2.

The guide member 7 is formed on at least two facing inner surfaces thereof with rail portions 7*a* that extend rearward and forward to slidably receive projections 8*d* formed on outer surfaces of side-wall portions 8*a* of the slider 8.

The switch finisher 2 and the guide member 7 are fixed at their rear portions by a base plate 6 so that their rear openings are closed up. The base plate 7 is provided with an ultraviolet light source 3, a red light source 4, a tact switch 5, and a not-shown electronic circuit on its front surface.

Figure 5:
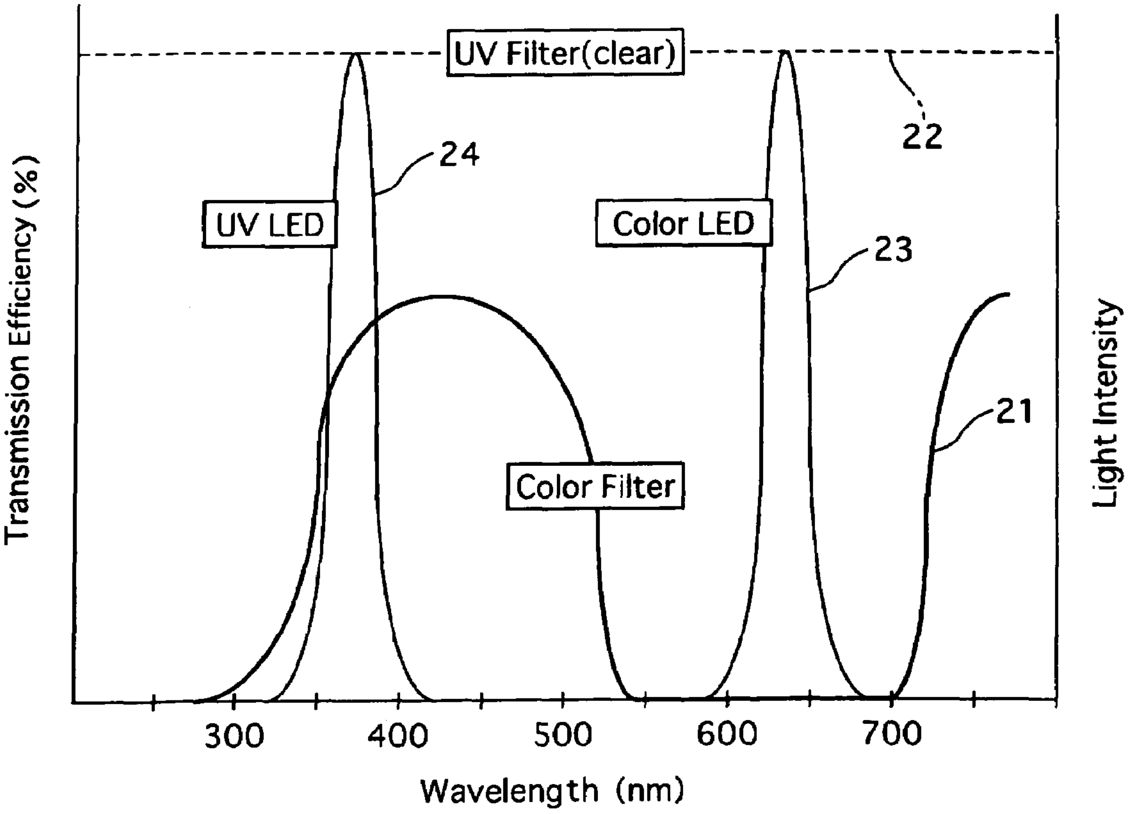
FIG. 5 is a diagram showing a characteristic relationships between wavelength of the filter and its transmission efficiency and between wavelengths of the light sources and their light intensities.

The violet light source 3 is constructed to cast ultraviolet light having a peak wavelength of approximately 360 nm as indicated by a thin line 24 in FIG. 5, and the red light source 4 is constructed to cast red light having a peak wavelength of approximately 640 nm as indicated by a thin line 23 in FIG. 5. These ultraviolet and red light sources 3 and 4 are made of diodes (LEDs) for emitting the ultraviolet and red light, respectively. In FIG. 5, the ultraviolet light emitted by the ultraviolet light 3 is denoted by "UV LED", and the red light emitted from the red light source 4 is denoted by "Color LED". Incidentally, the light sources 3 and 4 are preferably made of the LEDs because of low manufacturing and running costs in addition to easy maintenance, but they may be made of other devices, such as color lamps. The red light source acts as a color light source of the present invention.

The slider 8 has the side-wall portions 8*a* to form a square tube, and an inner slanted wall portion 8*b* arranged inside of and integrally formed with the side-wall portions 8*a*. The inner slanted wall portion 8*a* is shaped like a quadrangular-pyramid tube so that its opening becomes narrower from its front end toward its rear end. The rear end opening of the inner slanted wall portion 8*b* is formed so that the ultraviolet and red light sources 3 and 4 and the tact switch 5 are located within the rear end opening, where the tact switch 5 is located between the ultraviolet light source 3 and the red light source 4.

The slider 8 is provided at its front edge and inside portion thereof with a filter 10 with a smoked lens 11, which is arranged on a front surface of the filter 10 to cover it.

The smoked lens 11 has a low translucency in its whole area so that a user can not see printed patterns of the printed area parts, or profiles of a first display character "A" in white and a second display character "E" in red provided by printed area parts of the filter 10, from an exterior of the switch 1 therethrough in an outside light at lights-out time. In addition, the smoked lens 11 is made from material that can substantially block ultraviolet light from passing therethrough. The smoked lens 11 acts as a smoke area part and an ultraviolet light cut area part of the present invention. The printed area parts of the filter 10 will be later described in detail.

The first display character "A" corresponds to first display contents of the present invention, and the second display character "E" corresponds to second display contents of the present invention.

The tact switch 5 is electrically switchable between ON and OFF according to backward and forward movements of the slider 8 caused by the user's pressing and releasing the smoked lens 11. Specifically, the tact switch 5 is kept in contact with a tip of a projecting portion 8*c* projected rearward from the inner slanted wall portion 8*b*. When the user presses a front surface of the smoked lens 11, the slider 8 moves back together with the smoked lens 11 and the filter 10 along the rail portions 7*a* of the guide member 7. This causes the projecting portion 8*c* of the slider 8 to move backward, pressing the tact switch 5 to turn on the switch 1. After then, when the user releases the smoked lens 11 from a pressed state, the tact switch 5 pushes the smoked lens 11 and the slider 8 to move forward to its original position by reaction force of a not-shown spring of the tact switch 5.

Figure 2:
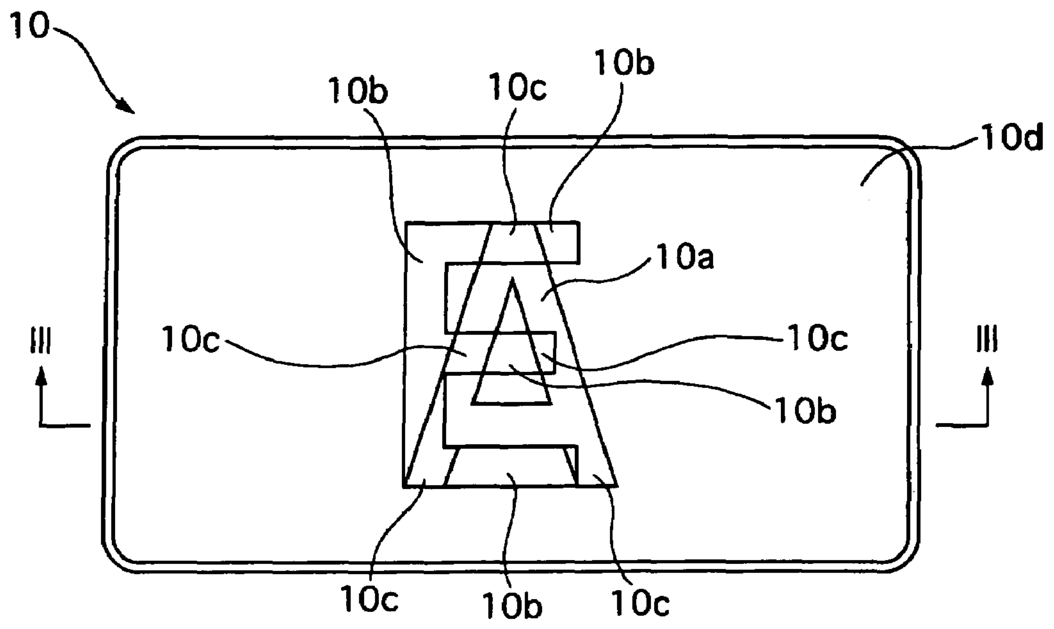
FIG. 2 is a plain view showing a filter, used in the display device shown in FIG. 1, for displaying two display contents having their overlapped part and different color.
Figure 3:
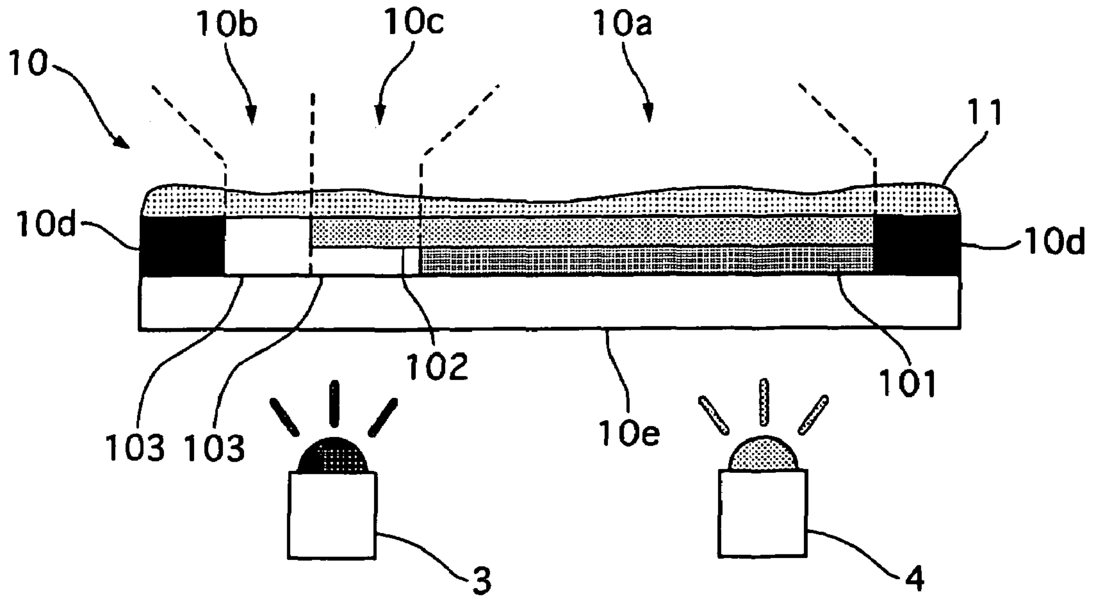
FIG. 3 is a cross sectional side view of the filter with a smoked lens, taken along the line III-III of FIG. 2, which is accompanied with a first light source and a second light source, where the smoked lens is cut away and partially shown.
Figure 4A:
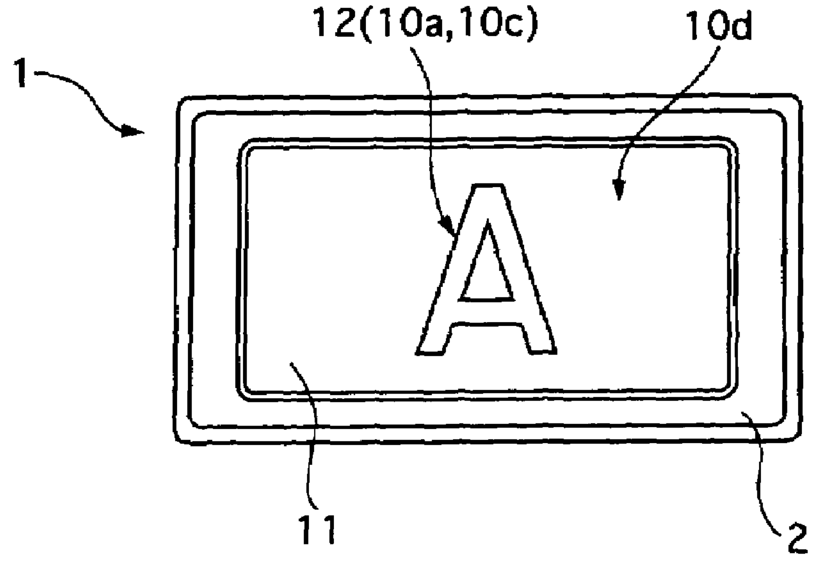
FIG. 4A is a plan view of a display state of the filter when first display character "A" appears therethrough.
Figure 4B:
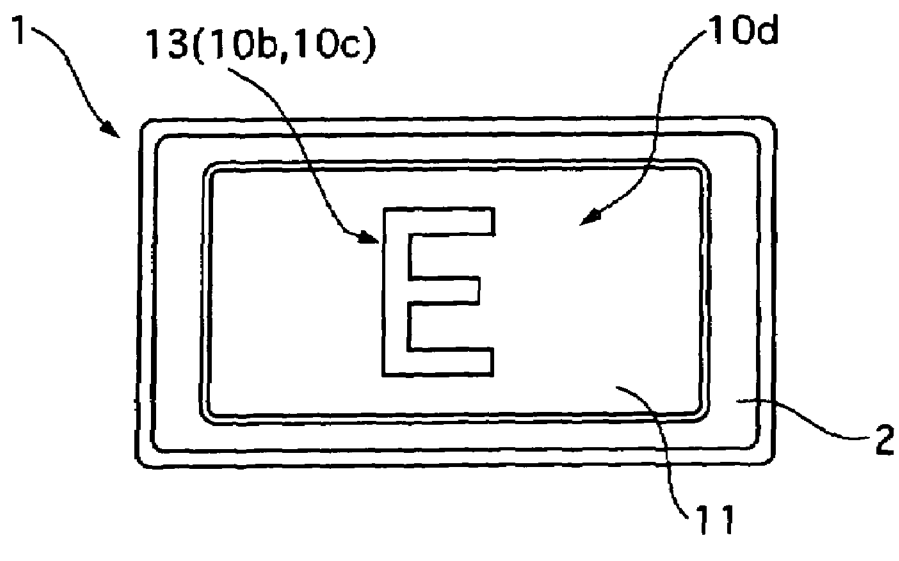
FIG. 4B is a plan view of a display state of the filter when second display character "E" appears therethrough.

As shown in FIGS. 2 and 3, the filter 10 includes a transparent sheet 10*e*, shown in FIG. 3, arranged at a rear side, a first printed area part 10*a*, a second printed area part 10*b*, a third printed area part 10*c*, and a background area part 10*d* in order to selectively show the first display character "A" and the second display character "E", which are shown in FIG. 4A and FIG. 4B and indicated by reference numbers 12 and 13, respectively. Note that these two display characters "A" and "E" are partially overlapped with each other as shown in FIG. 2 and the smoked lens 11 is partially shown in FIG. 3.

The first printed area part 10*a* is formed to display a residual display area part of the first display character "A" obtained by excluding overlapped display area parts of the first and second display characters "A" and "E" from a display area part of the first display character "A". The first printed area part 10*a* is made of a blue printed area part 101 and an ultraviolet printed area part 102, where they are piled up so that the latter is arranged in front of the former as shown in FIG. 3. The first printed area part 10*a* acts as a first area part of the present invention. The blue printed area part 101 acts as a color filter of the present invention, and the ultraviolet printed area part 102 acts as an ultraviolet filter of the present invention.

The blue printed area part 101 is set to have a characteristic of light transmission efficiency with respect to wavelength of light, which is indicated by a heavy line 21 in FIG. 5. This blue printed area part 101 allows the ultraviolet light to pass therethrough, but substantially blocks the red light from passing therethrough.

The ultraviolet printed area part 102 is made from fluorescent material so that color light can directly pass therethrough, while visible white light is produced and emitted when the ultraviolet light hits there. This characteristic of light transmission efficiency with respect to wavelength of light is indicated by a chained line 22 in FIG. 5. The chained line 22 denotes that its characteristic is changeable according to the color light and the ultraviolet light. The transparent printed area part 103 acts as a transparent filter of the present invention.

The second printed area part 10*b* is formed to display a residual display area part of the second display character "E" obtained by excluding overlapped display area parts of the first and second display characters "A" and "E" from a display area part of the second display character "E". The second printed area part 10*b* is made of a transparent printed area part 103, which may be made of unprinted area part instead thereof, so as to allow both of the ultraviolet light and the color light to pass therethrough. The second printed area part 10*b* acts as a second area part of the present invention.

The third printed area part 10*c* is formed to display the overlapped area parts of the first and second display characters "A" and "E". The third printed area part 10*c* is made of the ultraviolet area part 102 and the transparent printed area part 103, where they are piled up so that the latter is arranged at the back of the former. The third printed area part 10*c* acts as a third area part of the present invention.

The background printed area part 10*d* is formed to display a residual area part excluding the first to third printed area parts 10*a* to 10*c* from, being printed in black. The background printed area part 10*d* is set to absorb the color lights, including the red light emitted from the red light source 4, where it may be set for the ultraviolet light to pass therethrough or be substantially blocked. Accordingly, the user can see it in black whether the light sources 3 and 4 are turned on or not.

The operation of the switch 1 with the display device of the first embodiment will be described.

The display device of the first embodiment can be shifted between a nondisplay mode and two display character appearing modes.

Figure 6A:
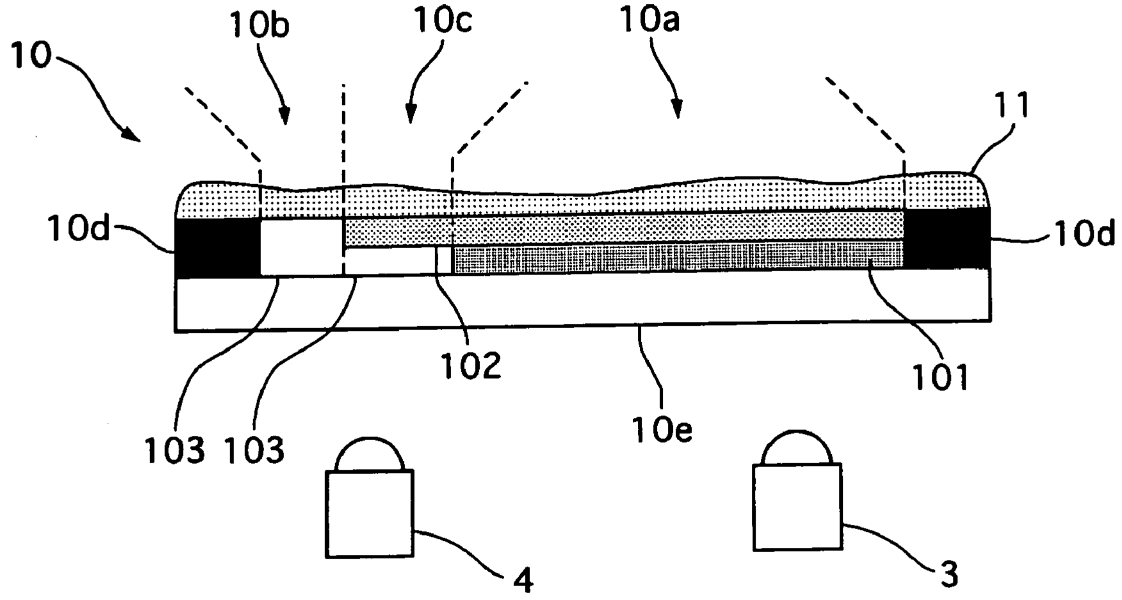
FIG. 6A is a cross sectional side view of the filter with the smoked lens accompanied with the light sources when no light source is controlled to emit light.
Figure 6B:
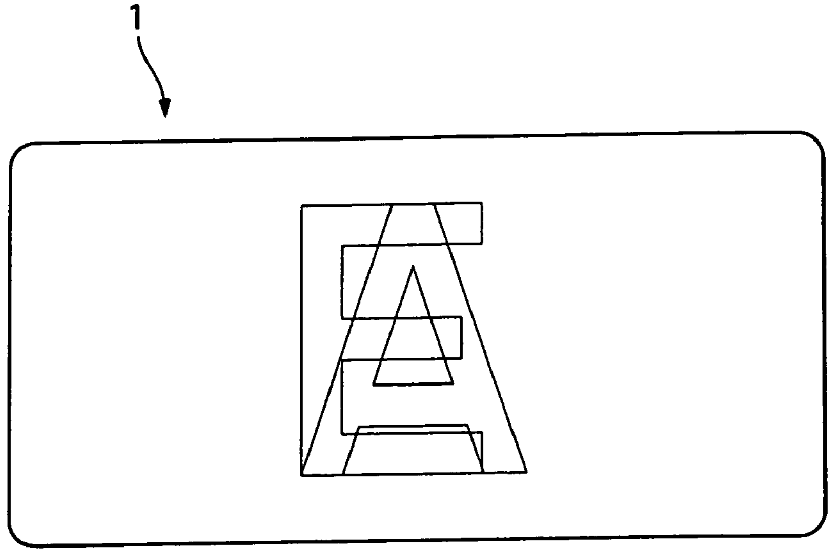
FIG. 6B is a plan view of a display state at that time of the filter through which no display character can be seen.

When the ultraviolet light source 3 and the red light source 4 are controlled to be turned off as shown in FIG. 6A, no light is emitted from them and therefore no display characters appears, so that the user can not see it from the exterior of the switch 1 through the smoked lens 11. In this case, the smoked lens 11 suppresses both of the color light and the ultraviolet light included in incoming light and its reflected light, when the incoming light comes into an interior of the display device from the exterior of the switch 1 and when the incoming light is reflected inside of the display device to go toward the filter 10 as the reflected light.

Specifically, the smoked lens 11 suppresses the color light and the ultraviolet light contained in the incoming light, and then suppresses those contained in the reflected light, including the white light produced at the ultraviolet area part 102 when it is hit by the ultraviolet light contained in both of the incoming light passing through the smoked lens 11 and the reflected light. This decreases brightness of the color light and the ultraviolet light, and accordingly prevents an interior mechanism of the display device and profiles, shown in FIG. 6B, of the first and second display characters "A" and "E" from being clearly seen by the user from the exterior of the switch 1. This provides a good visual quality.

Figure 7A:
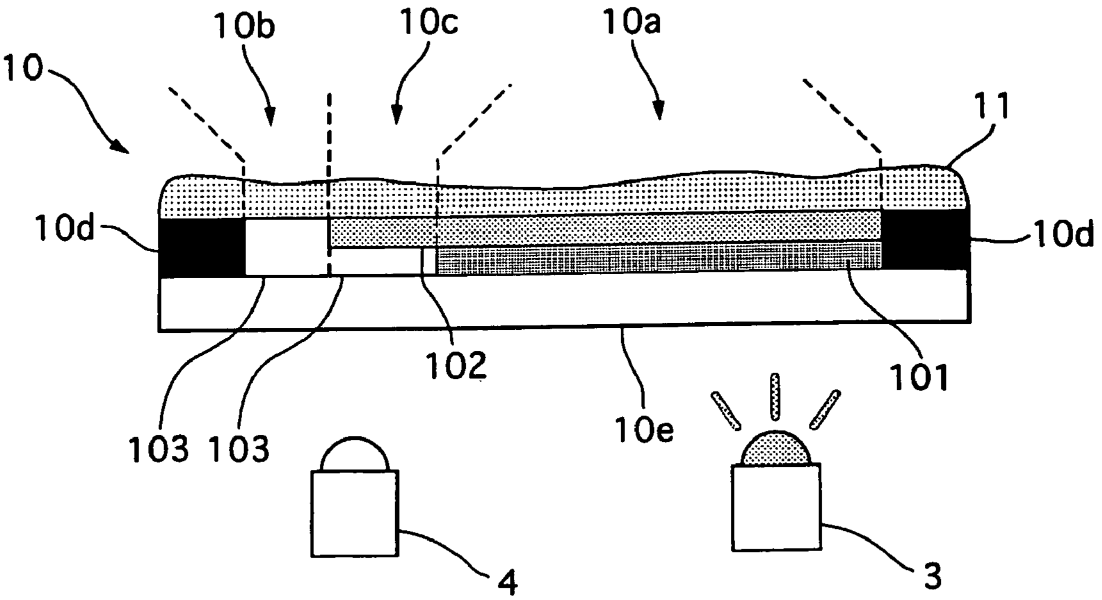
FIG. 7A is a cross sectional side view of the filter with the smoked lens accompanied with the light sources when the first light source is controlled to emit first light.

In order to display the first display character "A" in white, the ultraviolet light source 3 is controlled to be turned on so as to light up, while the red light source 4 is controlled to be turned off as shown in FIG. 7A. The ultraviolet light is emitted from the ultraviolet light source 3 in all possible directions. Some of the emitted ultraviolet light goes directly toward the filter 10 and some of it are reflected at the inner slanted wall portion 8*b* of the slider 8 and the base plate 6 to travel forward toward the filter 10.

The ultraviolet light enters and passes through the transparent sheet 10*e* of the filter 10.

Then, some of the ultraviolet light enters and goes through the blue printed area part 101 of the first printed area part 10*a*, where it does not contribute to display of any display characters because it is invisible. This ultraviolet light exiting the blue printed area part 101, then, hits the ultraviolet printed area part 102 located in front of the blue printed area part 101, and produces the visible white light that the user can see through the smoked lens 11 as an overlapped display part of the first display character "A" and the second display character "E" in white.

On the other hand, in the second printed area part 10*c*, some of the ultraviolet light, passing through the transparent sheet 10*e*, goes through the transparent printed area part 103 to hit the ultraviolet printed area part 102, which produces the visible white light that the user can see through the smoked lens 11 as a rest display part, excluding the overlapped display part, of the first display character "A" in white.

The rest of the ultraviolet light passing through the transparent sheet 10*e* also goes through the background printed area part 10*d*, which does not contribute to the display of any display characters.

Figure 7B:
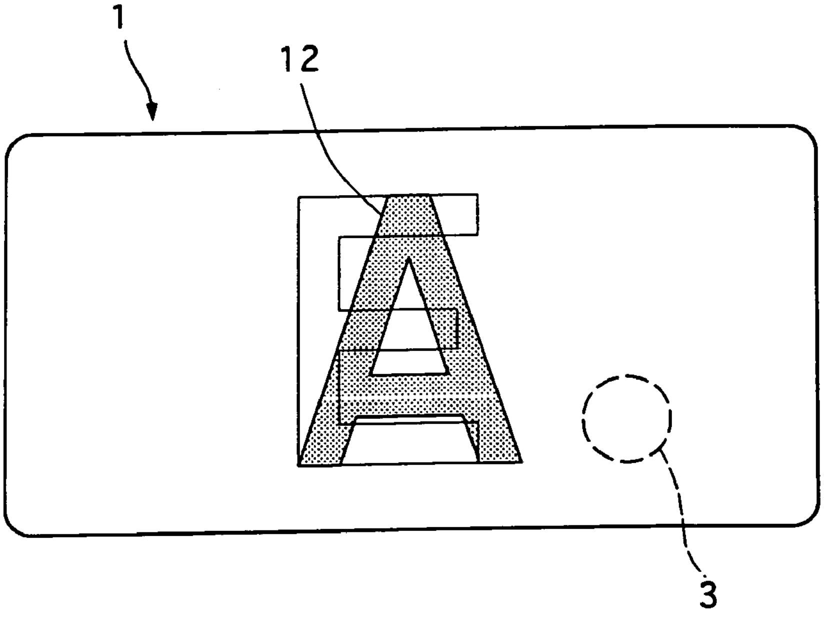
FIG. 7B is a plan view of a display state at the that time of the filter through which the first display character "A" can be seen.

Therefore, the user can see the entire display parts of the first display characters "A" in white from the exterior of the switch 1 through the smoked lens 11 as shown in FIG. 7B, where the profile of the second display character "E" is illustrated but can not be clearly seen by the user because of the smoked lens 11. This whit light corresponds to visible light of the present invention.

Figure 8A:
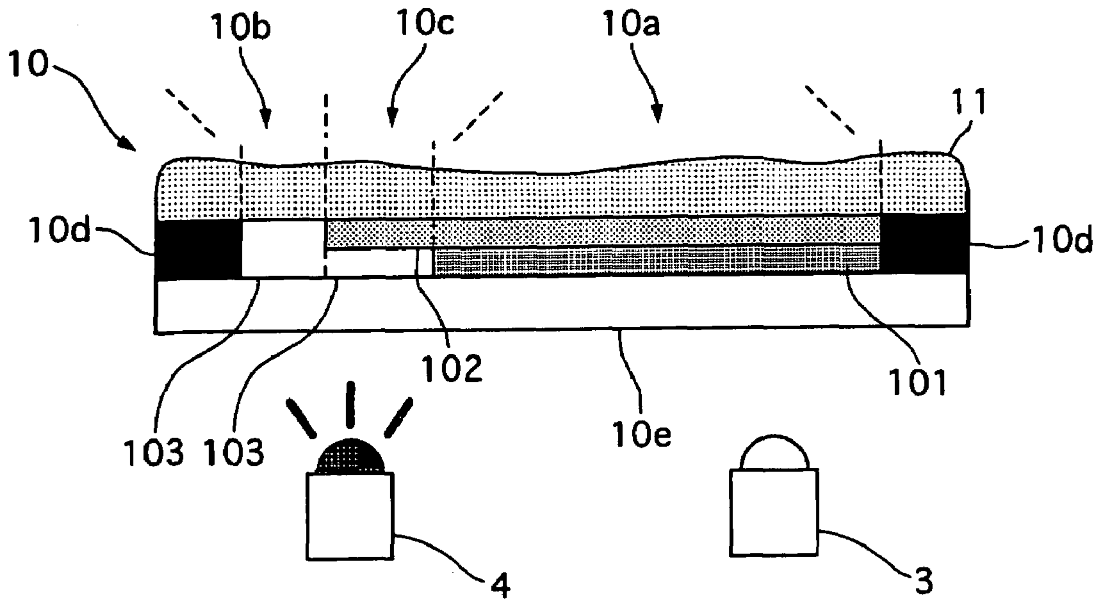
FIG. 8A is a cross sectional side view of the filter and the smoked lens accompanied with the light sources when the second light source is controlled to emit second light.

In order to display the second display character "E" in red, the ultraviolet light source 3 is controlled to be turned off, while the red light source 4 is controlled to be turned on so as to light up as shown in FIG. 8A. The red light is emitted from the red light source 3 in all possible directions, then traveling forward toward the filter 10.

This red light enters and passes through the transparent sheet 10*e* of the filter 10.

Then, some of the red light hits the blue printed area part 101 of the first printed area part 10*a*, where it is substantially blocked before reaching the ultraviolet printed area part 102, thereby not contributing to display of any display characters.

On the other hand, some of the red light passing through the transparent sheet 10*e* enters and goes through the transparent printed area part 103 of the second printed area part 10*c*, which displays the overlapped display part of the first display character "A" and the second display character "E" in red, so that the user can see it through the smoked lens 11 from the exterior of the display device.

Some of the red light passing through the transparent sheet 10*e* goes through the transparent sheet 10*e* and the transparent printed area part 103 and then goes through the ultraviolet printed area part 102, which displays a rest display part, excluding the overlapped display part, of the second display character "E" in red, so that the user can see it through the smoked lens 11 from the exterior of the display device.

The rest of the red light hits the background printed area 10*d*, where it is substantially blocked, not contributing to display of any display characters.

Figure 8B:
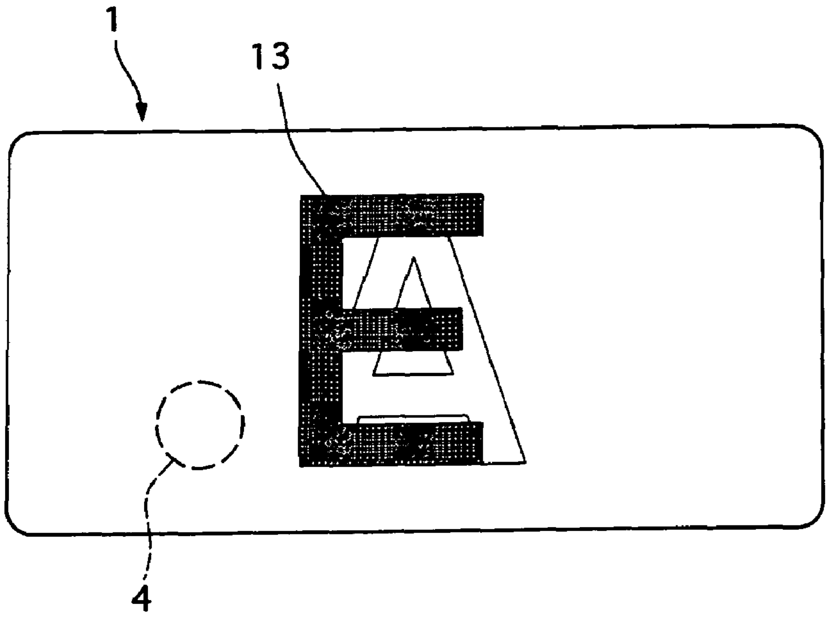
FIG. 8B is a plan view of a display state at that time of the filter through which the second display character "E" can be seen.

Therefore, the user can see the entire parts of the second display character "E" in red from the exterior of the switch 1 through the smoked lens 11 as shown in FIG. 8B, where the profile of the first display character "A" is illustrated but can not be clearly seen by the user because of the smoked lens 11.

These three modes, consisting of the nondisplay mode, white display character appearing mode, and red display character appearing mode, are shiftable by pressing the smoked lens 11 rearward.

The user's pressing the smoked lens 11 rearward moves the slider 8, which is integrally fixed to the smoked lens 11, along the rail portions 7*a* of the guide member 7, so that its projecting portion 8*c* moves backward to press the tact switch 5 to be turned on.

The electronic circuit on the base plate 6 is electrically connected to the tact switch 5 so as to receive a switch signal when the tact switch 5 is pressed, and judges whether the switch signal is inputted from the tact switch 5 to the electronic circuit or not and what mode the display device is immediately prior to receiving this new switch signal. Then it determines what mode the display device should be shifted to, based on the new switch signal and the immediately previous mode of the display device, and controls the ultraviolet and red light sources 3 and 4 based on its decision.

The display device of the first embodiment has the following advantages.

The display device of the first embodiment is constructed to have the ultraviolet light source 3, the red light source 4, the first printed area part 10*a* forming the display part of the first display character "A" excluding the overlapped area parts of the first and second display characters "A" and "B" and having the blue printed part 101 and the ultraviolet light 102, the second printed area part 10*b* forming the display part of the second display character "E" excluding the overlapped area parts and having the transparent printed area part, the third printed area part 10*c* forming the display part of the overlapped area parts and having the ultraviolet printed area part 102 and the transparent printed area part 103, and the background area part 10*d* for blocking the visible light, where the blue printed area part 101 can block the red light, the ultraviolet printed area part 102 can produce the white light by hitting of the ultraviolet light, and the transparent printed area part 103 allows the red light and the ultraviolet light to pass therethrough. Therefore, the display device can shiftably display the first display character "A" in white and the second display character "E" in red which have the overlapped area parts. The first display character "A" can be displayed in color different from that of the filter 10, white, in the first embodiment, which can not be obtained by conventional display devices. This enables the display device to extend freedom degree of display expression.

Note that, although the ultraviolet light and the ultraviolet printed area part 102 produces the visible white light in this embodiment, they can produce visible lights in various colors by changing fluorescent material of the ultraviolet printed area part 102, thereby enabling to extend the freedom degree of display expression. Incidentally, when the ultraviolet light and the ultraviolet printed area part 102 are set to produce the white light for displaying the first display character, the background printed area part 10*d* is printed preferably in black so that the first display character makes sharp contrast wit its background, thereby highly improving its visibility.

The second display character is displayed in red in this embodiment, and may be displayed in another color in order to extend the freedom degree of display expression. In this case, the red light source 4 and the blue printed area part 101 are replaced by a desired-color light source and another-color printed area part that can substantially block the desired-color light and allow the ultraviolet light to pass therethrough. This color change of the second display character does not affect the color of the first display character which is partially overlapped with the second display character, because the ultraviolet light passing through this replaced color printed area does not produce any display part of the display characters.

The smoked lens 11 are arranged at the front side of the filter 10, which can prevent the interior structure of the switch 1 including its printed area parts from being seen by the user through the smoked lens 11 from the exterior of the switch 1. This can increase its visual quality. In addition, the smoked lens 11 is made from the material that can substantially block the ultraviolet light from passing therethrough, improving its visual quality by suppressing the white light produced at the ultraviolet printed area part when the incoming light comes in the display device from the exterior side and reflected there.

In stead of using the above-described smoked lens 11 made from ultraviolet light-cuttable material, an ultraviolet light cut area part, made from material capable of substantially blocking the ultraviolet light, may be arranged between the color filter 10 and the user. In this case, the ultraviolet light cut area part may be used with a normal smoked lens, which can not cut the ultraviolet light.

The tact switch 5 and the electro circuit enable the display switch 1 to shift among the three display modes by using one switch, changing colors of the display characters. The user can easily recognize the display characters without an additional device such as an indicator.

Next, a display device of a second embodiment according to the present invention will be described with reference to the accompanying drawings of FIGS. 9 to 21C.

Figure 9:
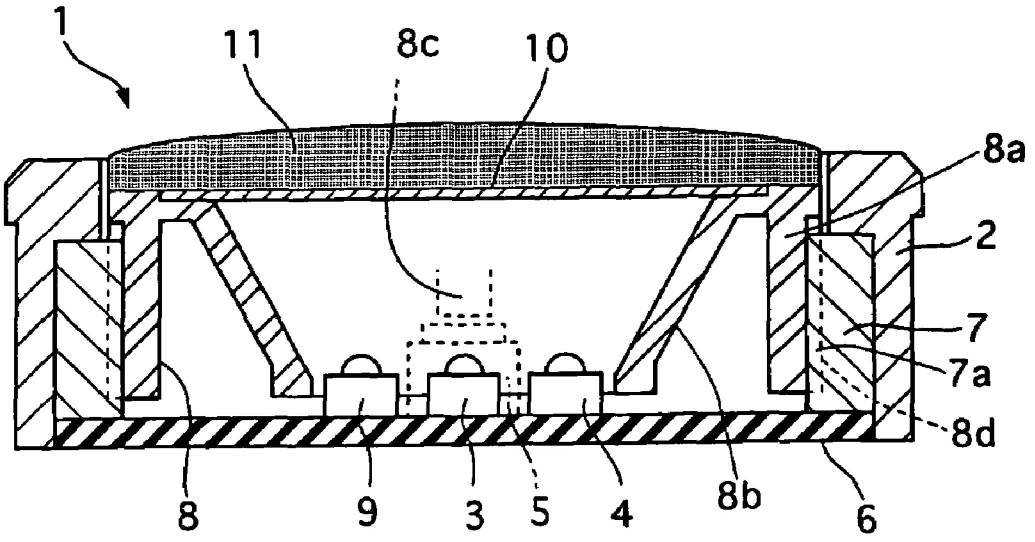
FIG. 9 is a cross sectional side view showing a switch with a display device of a second embodiment according to the present invention.
Figure 10:
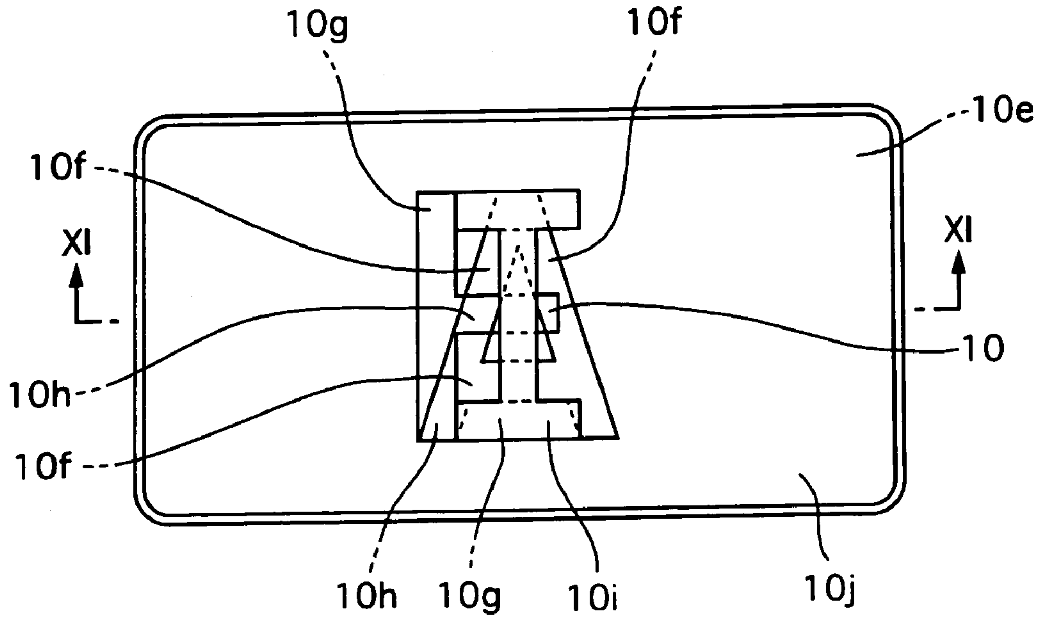
FIG. 10 is a plain view of a filter, used in the display device shown in FIG. 9, for displaying three display characters in colors different from each other.
Figure 11:
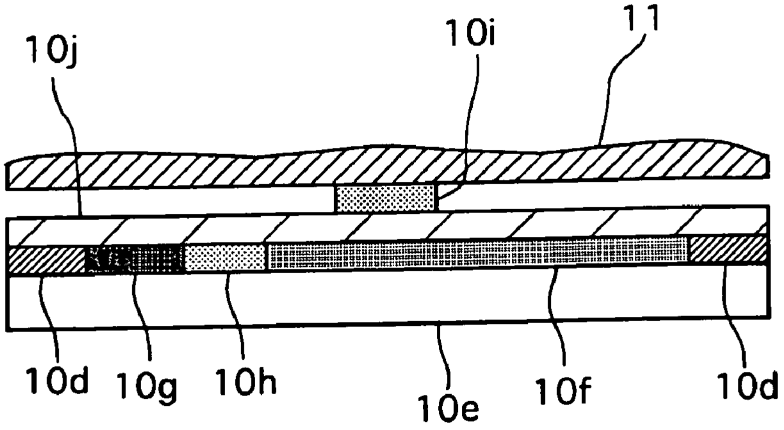
FIG. 11 is a cross sectional side view of the filter with a smoked lens taken along the line XI-XI of FIG. 10, where the smoked lens is cut away and partially shown.
Figure 12:
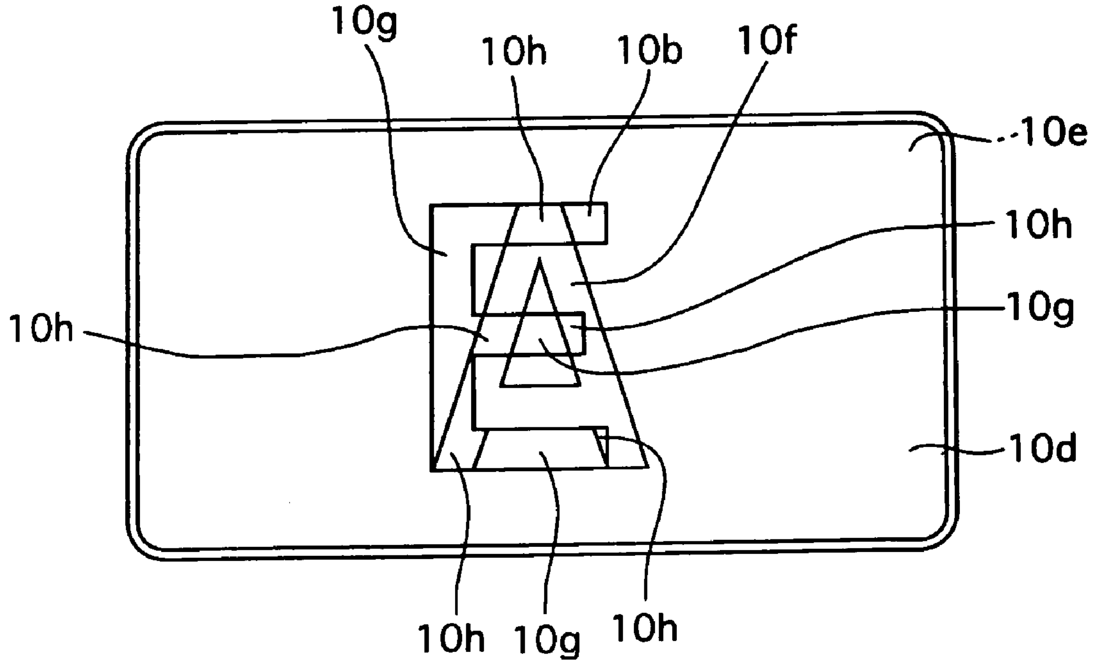
FIG. 12 is a plan view of the filter having printed parts for displaying first display character "A" and second display character "E"

Referring to FIGS. 9 to 11, there is shown a display device of the second embodiment, adapted for a switch 1.

The switch 1 is provided with a switch finisher 2, a guide member 7 fixed to a lower and inner part of the switch finisher 2, a slider 8 arranged inside of the switch finisher 8 and capable of sliding rearward and forward, corresponding to downward and upward in FIG. 9, respectively, and a display device arranged within the switch finisher 2.

Figure 13A:
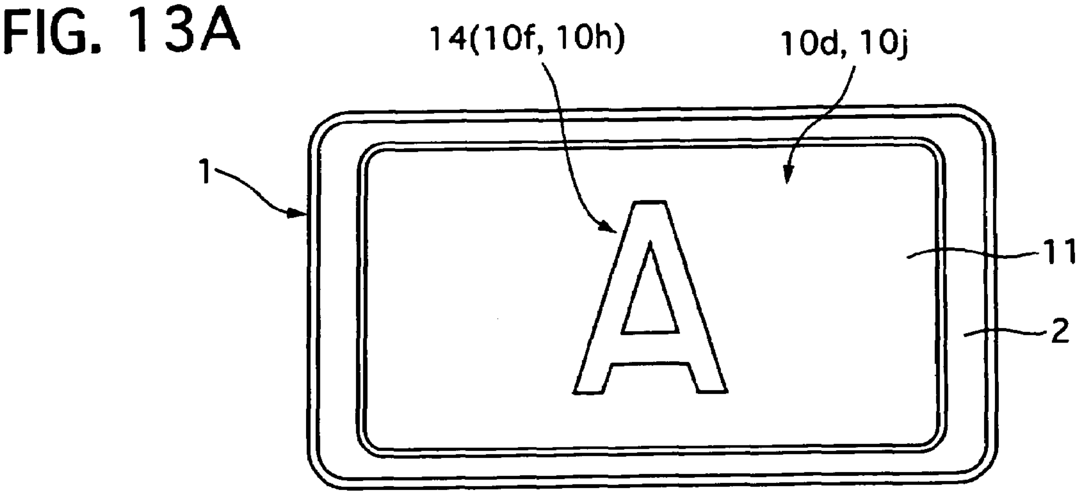
FIG. 13A is a plan view of the filter through which the first display character "A" can be seen.
Figure 13B:
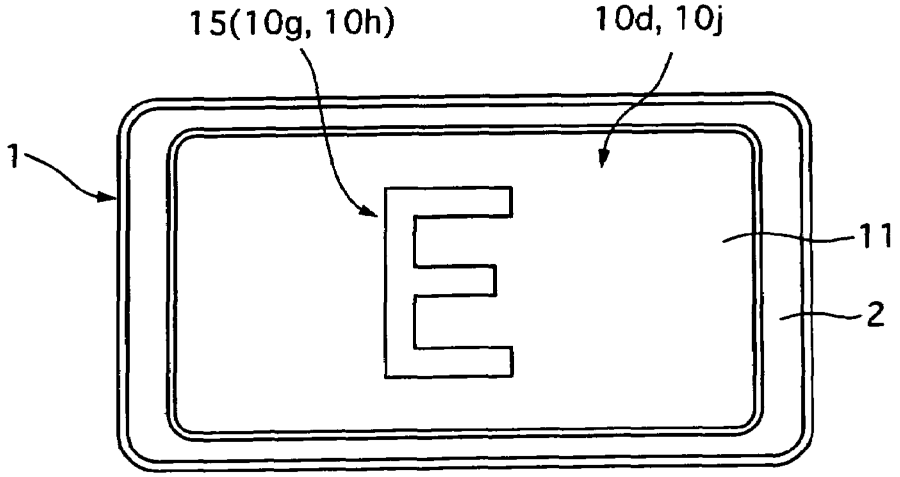
FIG. 13B is a plan view of the filter through which the second display character "E" can be seen.
Figure 13C:
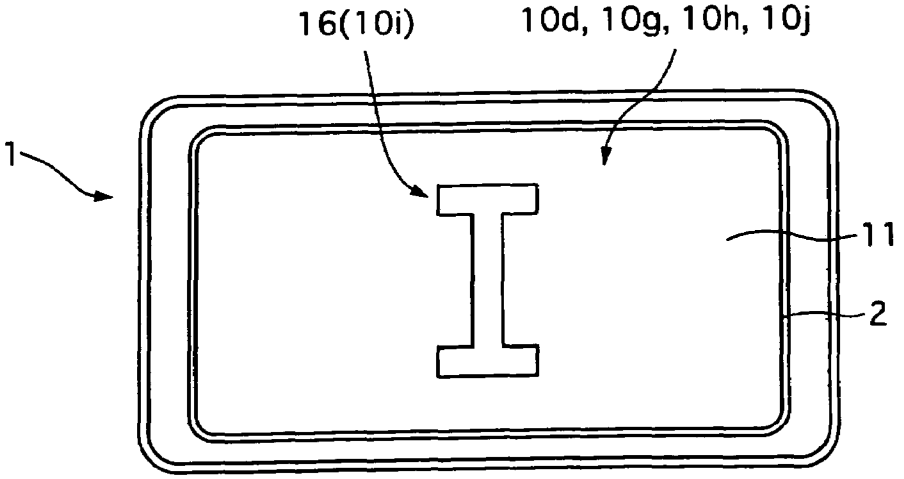
FIG. 13C is a plan view of the filter through which third display character "I" can be seen.

The display device has an ultraviolet light source 3, a red light source 4, a blue light source 9, a filter 10, and a smoked lens 11 so that it can selectively appear three display characters, a third display character "A" in red as indicated by a reference number 14 in FIG. 13A, a fourth display character "E" in blue as indicated by a reference number 15 in FIG. 13B, and a fifth display character "I" in white as indicated by a reference number 16 in FIG. 13C. Note that these third to fifth display characters "A", "E" and "I" have overlapped parts partially overlapped with each other as shown in FIG. 10.

The red light source and the blue light source act as a first color light source and a second color light source of the present invention, respectively. They also act as the a color light source of the present invention. The fifth display character "I" corresponds to first display contents of the present invention. The third display character "A" and the fourth display character "E" correspond to third display contents and fourth display contents of the present invention, respectively, both of them also corresponding to second display contents of the present invention.

Figure 14:
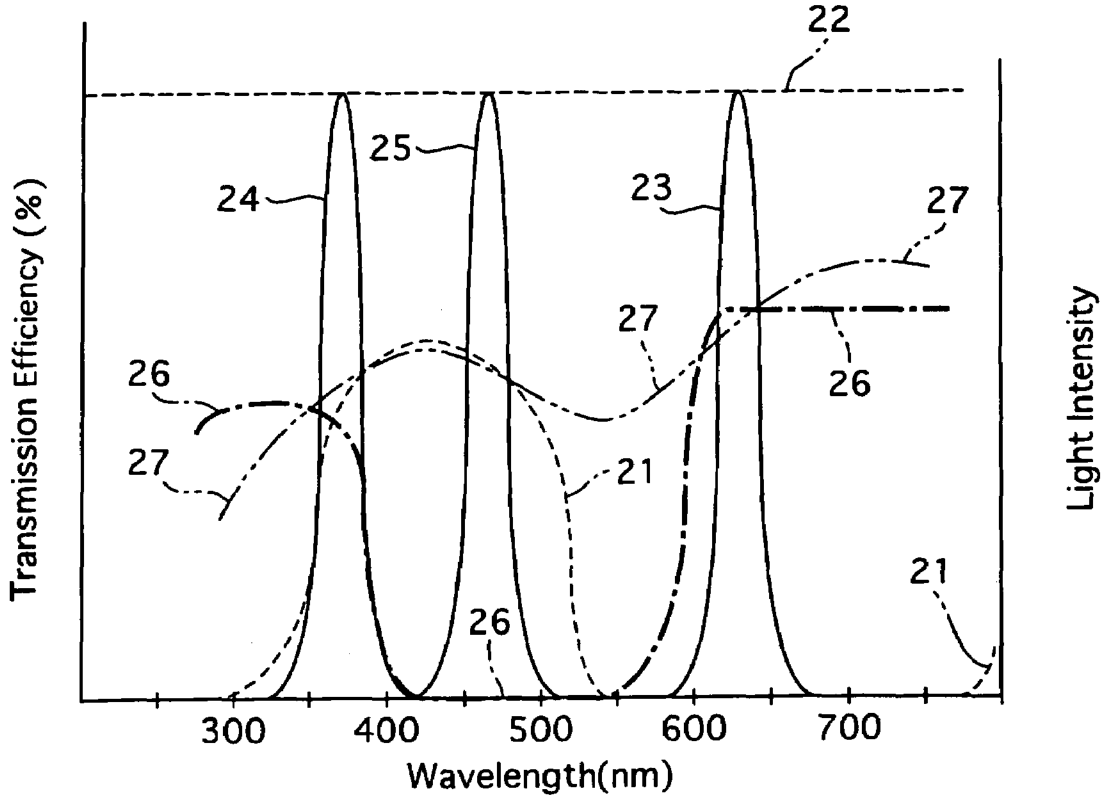
FIG. 14 is a diagram showing a characteristic relationships between wavelength of the filter and its transmission efficiency and between wavelengths of three light sources and their light intensities.

The ultraviolet light source 3 is constructed to cast ultraviolet light having a peak wavelength of approximately 640 nm as indicated by a solid line 24 in FIG. 14. The red light source 4 is constructed to cast red light having a peak wavelength of approximately 360 nm as indicated by a solid line 23 in FIG. 14. The blue light source 9 is constructed to cast blue light having a peak wavelength of approximately 470 nm as indicated by a solid line 25 in FIG. 14. Incidentally, these light sources 3, 4 and 9 are made of diodes (LEDs) and may be made of other devices. The light sources 3, 4 and 9 are arranged within an inner slanted wall portion 8*b* of the slider 8.

As shown in FIG. 11, the filter 10 includes a transparent sheet 10*e*, a background printed area part 10*d*, a fourth printed area part 10*f*, a fifth printed area part 10*g*, a sixth printed area part 10*h*, a seventh printed area part 10*i*, and a smoke printed area part 10*j*. The forth to sixth printed area parts 10*f* to 10*h* are arranged at the same plane between a front surface of the transparent sheet 10*e* and a back surface of the smoke printed area part 10*j*, and the seventh printed area 10*i* is arranged between a front surface of the smoke printed area part 10*j* and a rear surface of the smoked lens 11.

The fourth printed area part 10*f* is formed to display a rest display area part of the third display character "A" excluding overlapped area parts of the third display character "A" and the fourth display character "E", and made of a red printed area part that allows the red light to pass therethrough and substantially block the blue light. This red printed area part is set to have a characteristic of light transmission efficiency with respect to wavelength of light, indicated by an alternate long and short dash line 26 in FIG. 14. The fourth printed area part 10*f* acts as a fourth area part, a part of a second area part and a part of the third area part of the present invention.

The fifth printed area part 10*g* is formed to play a rest display part of the fourth display character "E" excluding overlapped area parts of the third display character "A" and the fourth display character "E", and made of a blue printed area part that allows the blue light to pass therethrough and substantially block the red light. This blue printed area part is se to have a characteristic of light transmission efficiency with respect to wavelength of light, indicated by a chained line 21 in FIG. 14. The fifth printed area part 10*g* acts as a fifth area part, a part of the second area part and a part of the third area part of the present invention.

The sixth printed area part 10*h* is formed to display the overlapped area parts of the fourth display character "A" and the fifth display character "E", and made from material that allows both of the red light and the blue light to pass therethrough. The overlapped area parts are set to have a characteristic of light transmission efficiency with respect to wavelength of light, indicated by a chain double-dashed line 27 in FIG. 14. The sixth printed area part 10*h* acts as a sixth area part, a part of the second area part and a part of the third area part of the present invention.

The seventh printed area part 10*i* is formed to display an entire display part of the fifth display character "I" including overlapped area parts of the third and fifth display characters "A" and "I" and the fourth and fifth display characters "E" and "I". The seventh printed area part 10*i* is made of an ultraviolet printed area part that allows both of the red light and the blue light to pass therethrough and also produce visible white light when the ultraviolet light hits the ultraviolet printed area part. The seventh printed area part 10*i* acts as a first area part and the third area part of the present invention.

This ultraviolet printed area part is set to have a characteristic of light transmission efficiency with respect to wavelength of light, indicated by a chained line 22 in FIG. 14. The chained line 22 denotes that its characteristic is changeable according to the color light and the ultraviolet light. By changing material of the ultraviolet printed area part, the color of the fifth display character "I" can be display in different colors.

The background printed area part 10*d* is formed to display a residual part of a display area excluding the fourth to seventh printed area parts 10*e* to 10*i*, being printed in black. The background printed area part 10*d* is set to absorb the color lights, including the red light emitted from the red light source 4 and the blue light emitted from the blue light source 9, where it may be set for the ultraviolet light to pass therethrough or be substantially blocked. Accordingly, the user can see it in black whether the light sources 3, 4 and 9 are turned on or not.

Incidentally, the fourth to sixth printed area parts 10*f* to 10*h* and the background printed area part 10*d* allow the ultraviolet light to pass therethrough.

The smoke printed area part 10*j* is arranged at a front side of the filter 10 and set to have a lower efficiency of light transmission so that brightness of the color light passing therethrough is decreased.

A tact switch 5 is arranged on a base plate 6 in the switch finisher 2, and switchable between ON and OFF according to backward and forward movements of the slider 8 by user's operation. When the user presses a front surface of the smoked lens 11, the slider 8 moves back together with the smoked lens 11 and the filter 10, being pressed by a projecting portion 8*c* of the slider 8 contacting with the tact switch 5 to turn on the switch 1. After then, when the user releases the smoked lens 11 from a pressed state, the tact switch 5 pushes the smoked lens 11 and the slider 8 to move forward to its original position by reaction force of the tact switch 5.

An electronic circuit on the base plate 6 is electrically connected to the tact switch 5 so as to receive a switch signal when the tact switch 5 is pressed, and judges whether the switch signal is inputted from the tact switch 5 to the electronic circuit or not and what mode the display device is immediately prior to receiving this new switch signal. Then it determines what mode the display device should be shifted to, based on the new switch signal and the immediately previous mode of the display device, and controls the ultraviolet, red and blue light sources 3, 4 and 9 based on its decision in order to shift three display characters in different colors.

The other parts of the second embodiment are constructed similarly to those of the first embodiment.

The operation of the switch 1 with the display device of the second embodiment will be described.

The display device of the second embodiment can be shifted among a nondisplay mode and three display character appearing modes.

Figure 15A:
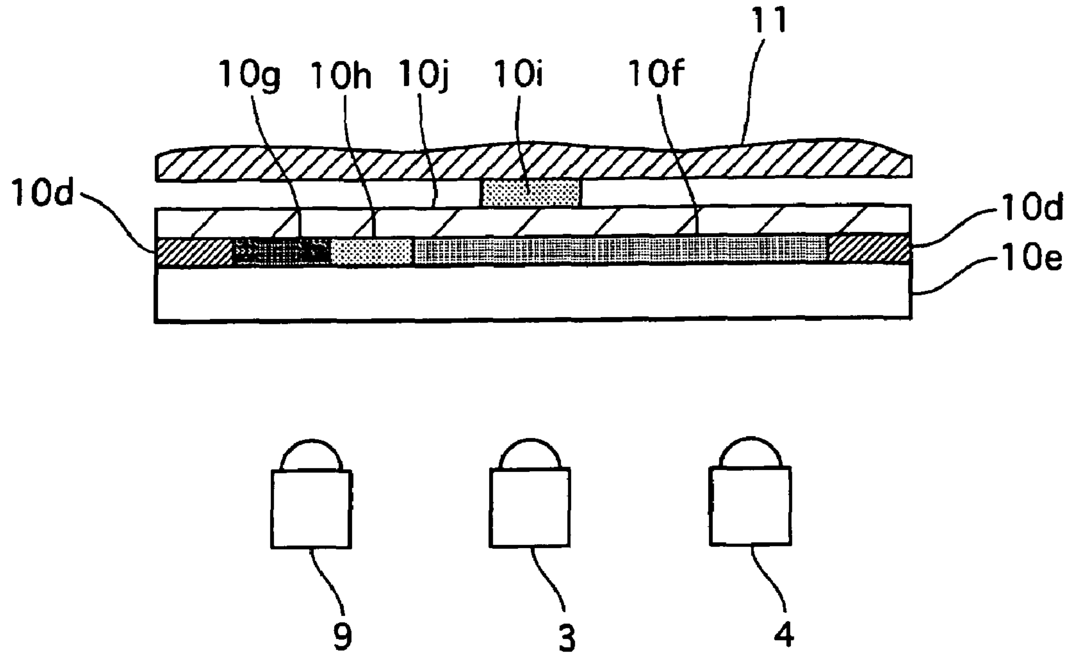
FIG. 15A is a cross sectional side view of the filter with the smoked lens accompanied with the light sources when no light sources is controlled to emit light.
Figure 15B:
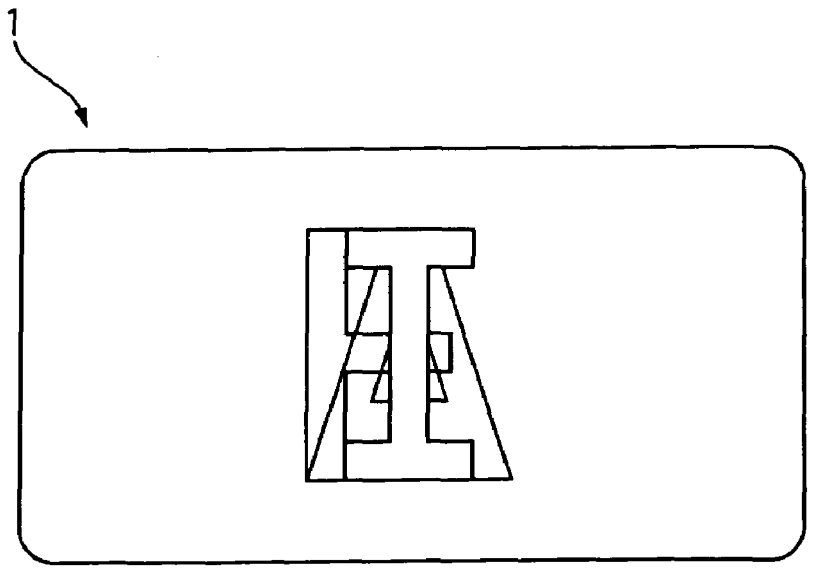
FIG. 15B is a plan view of a display state at that time of the filter through which no display character appears.

When the first, second and third light sources 3, 4 and 9 are controlled to be turned off as shown in FIG. 15A, no light is emitted from them and therefore no display characters appears, so that the user can not see it from an exterior of the switch 1 through the smoked lens 11. In this case, the smoked lens 11 and the smoke printed area part 10*j* suppress both of the color light and the ultraviolet light included in incoming light and its reflected light, when the incoming light comes into an interior of the display device from the exterior of the switch 1 and when the incoming light is reflected inside of the display device to go toward the filter 10 as the reflected light.

Specifically, the smoked lens 11 and the smoke printed area part 10*j* suppress the color light and the ultraviolet light contained in the incoming light, and then suppress those contained in the reflected light, including the white light produced at the ultraviolet area part 102 when it is hit by the ultraviolet light contained in both of the incoming light passing through the smoked lens 11 and the reflected light. This decreases brightness of the color light and the ultraviolet light, and accordingly prevents an interior mechanism of the display device and profiles, shown in FIG. 15B, of the third, fourth and fifth display characters "A", "E" and "I" from being clearly seen by the user from the exterior of the switch 1. This provides a good visual quality.

Figure 16A:
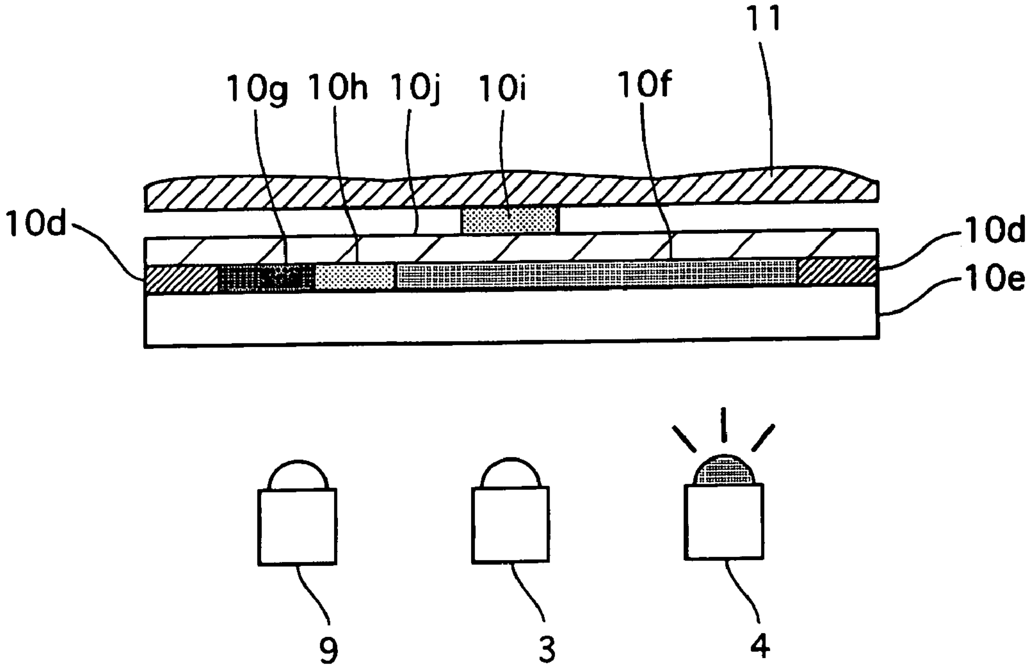
FIG. 16A is a cross sectional side view of the filter with the smoked lens accompanied with the light sources when a first light source is controlled to emit first light.

In order to display the third display character of "A" in red, the red light source 4 is controlled to be turned on so as to light up, while the ultraviolet light source 3 and the blue light source 9 are controlled to be turned off as shown in FIG. 16A. The red light is emitted from the red light source 4 in all possible directions. Some of the emitted red light goes directly forward the filter 10 and some of it are reflected at the inner slanted wall portion 8*b* of the slider 8 and the base plate 6 to travel forward toward the filter 10.

This red light enters and passes through the transparent sheet 10*e* of the filter 10.

Then, some of the red light enters and goes through the red printed area part of the fourth printed area part 10*f*, because of their characteristics indicated by the lines 23 and 26 in FIG. 14, to display a display part, excluding an overlapped display part of the third and fourth display characters "A" and "E", of the third display character "A" in red. This red light goes through the ultraviolet printed area 10*i* arranged in front of the red printed area part.

Some of the red light hits the blue printed area part of the fifth printed area part 10*g*, where it is blocked because of their characteristics indicated by the lines 23 and 21 in FIG. 14, not contributing to display of any display characters.

Some of the red light enters and goes through the sixth printed area part 10*h* because of their characteristics indicated by the lines 23 and 27 in FIG. 14, to display the rest display part, corresponding to the overlapped display part, of the third display character "A" in red. This red light also goes through the ultraviolet printed area 10*i* arranged in front of the sixth printed area part 10*h*.

The rest of the red light hits the background printed area part 10*d*, where it is blocked because of absorption of the red light, not contributing to the display of any display characters.

This red light displaying the third display character "A" is entirely decreased in brightness by the smoke printed area part 10*j* and then passes through the smoked lens 11, where its is further decreased by the smoked lens 11. Incidentally, a part of the red light passing through the smoke printed area part 10*j* enters the smoked lens 11 through the ultraviolet printed area part 10*i*.

Figure 16B:
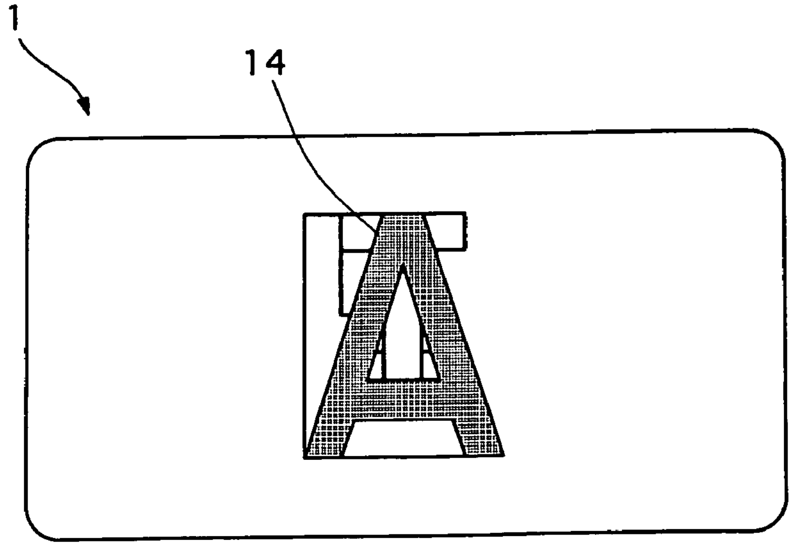
FIG. 16B is a plan view of a display state at that time of the filter through which the first display character "A" appears.

Therefore, the user can see the entire display parts of the third display character "A" in red from the exterior of the switch 1 through the smoked lens 11 as shown in FIG. 16B, where profiles of the fourth and fifth display characters "E" and "I" are illustrated but can not be clearly seen from the exterior because of the smoked printed area part 10*j* and the smoked lens 11, thereby improving a visual quality.

Figure 17A:
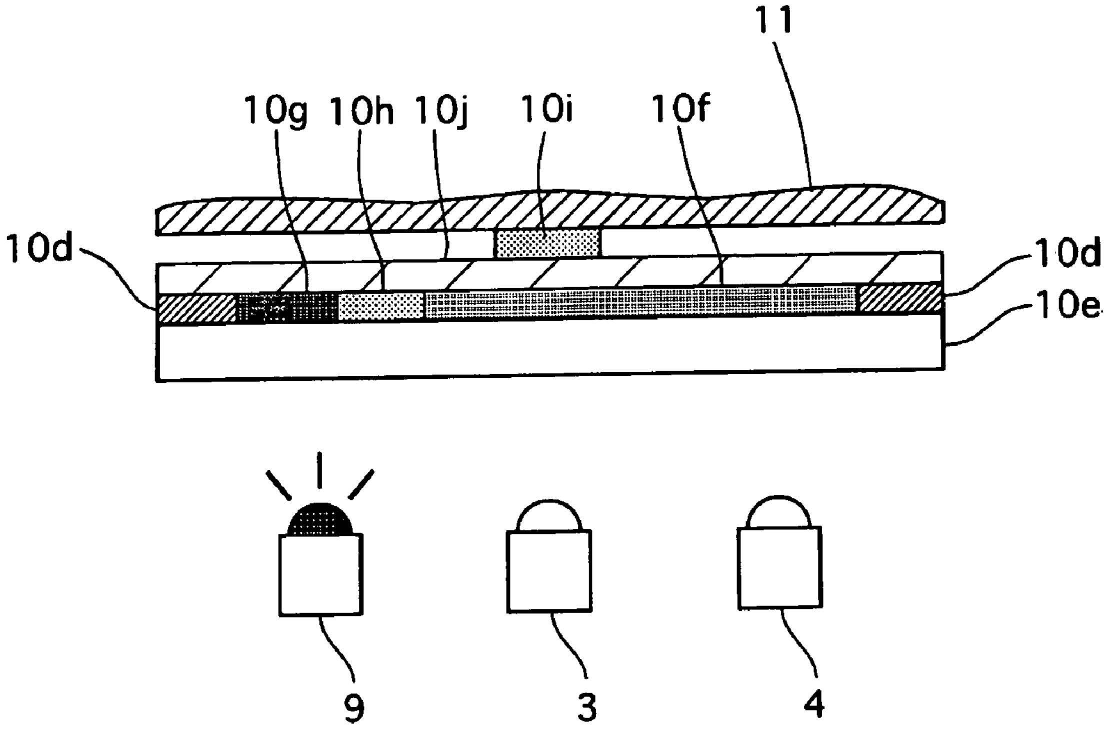
FIG. 17A is a cross sectional side view of the filter with the smoked lens accompanied with the light sources when a second light source is controlled to emit second light.

In order to display the fourth display character "E" in blue, the blue light source 9 is controlled to be turned on so as to light up, while the ultraviolet light source 3 and the red light source 4 are controlled to be turned off as shown in FIG. 17A. The blue light is emitted from the blue light source 9 in all possible directions, then traveling forward similarly when the red light is emitted.

This blue light enters and passes through the transparent sheet 10*e*.

Then, some of the blue light hits the red printed area part of the fourth printed area part 10*f*, where it is blocked because of their characteristics indicated by the lines 25 and 26 in FIG. 14, not contributing to the display of any display characters.

Some of the blue light enters and goes through the blue printed area part of the fifth printed area part 10*g*, because of their characteristics indicated by the lines 25 and 21 in FIG. 14, to display a display part, excluding an overlapped display part of the third and fourth display characters "A" and "E", of the fourth display character "E" in blue.

Some of the blue light enters and goes through the sixth printed area part 10*h*, because of their characteristics indicated by the lines 25 and 27 in FIG. 14, to display a rest display part, corresponding to the overlapped display part, of the fourth display character "E" in blue.

The rest of the blue light hits the background printed area part 10*d*, where it is blocked because of absorption of the blue light, not contributing to display of any display characters.

Figure 17B:
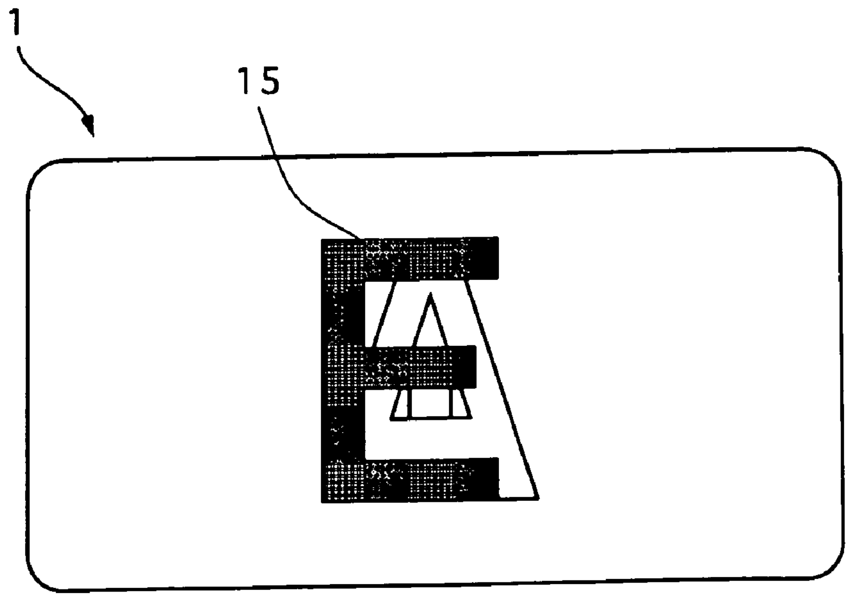
FIG. 17B is a plan view of a display state at that time of the filter through which the second display character "E" appears.

Therefore, the user can see the entire display parts of the fourth display character "E" in blue from the exterior of the switch 1 through the smoked lens 11 as shown in FIG. 17B, where profiles of the third and fifth display characters "A" and "I" are illustrated but can not be clearly seen from the exterior because of the smoked printed area part 10*j* and the smoked lens 11, thereby improving the visual quality.

Figure 18A:
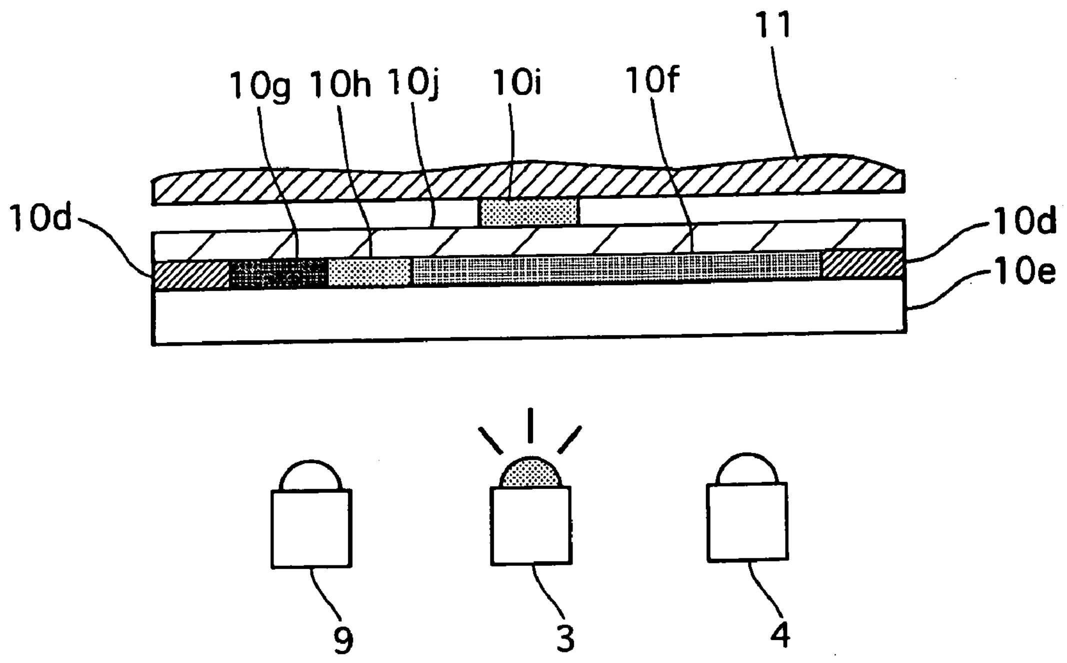
FIG. 18A is a cross sectional side view of the filter with the smoked lens accompanied with the light sources when a third light source is controlled to emit third light.

In order to display the fifth display character "I" in white, the ultraviolet light source 3 is controlled to be turned on so as to light up, while the red light source 4 and the blue light source 9 are controlled to be turned off as shown in FIG. 18A. The ultraviolet light is emitted from the ultraviolet light source 3 in all possible directions, then traveling forward similarly when the red light and blue light are emitted.

This ultraviolet light hits and passes through the transparent sheet 10*e* of the filter 10.

Then, some of the ultraviolet light enters and goes through the red printed area part of the fourth printed area part 10*f*, because of their characteristics indicated by the lines 24 and 26, not contributing to the display of any display characters since the ultraviolet light is invisible.

Some of the ultraviolet light enters and goes through the blue printed area part of the fifth printed area 10*g*, because of their characteristics indicated by the lines 24 and 21, not contributing to the display of any display characters.

Some of the ultraviolet light enters and goes through the sixth printed area 10*h*, because of their characteristics indicated by the lines 24 and 27, not contributing to the display of any display characters since the ultraviolet light is invisible.

Some of the ultraviolet light hits the ultraviolet printed area part of the seventh printed area part 10*i* to produce an entire display of the fifth display character "I" in white because of their characteristics indicated by the lines 24 and 22.

The rest of the ultraviolet light enters and goes through the background printed area part 10*d*, not contributing to the display of any display characters since it is invisible.

Figure 18B:
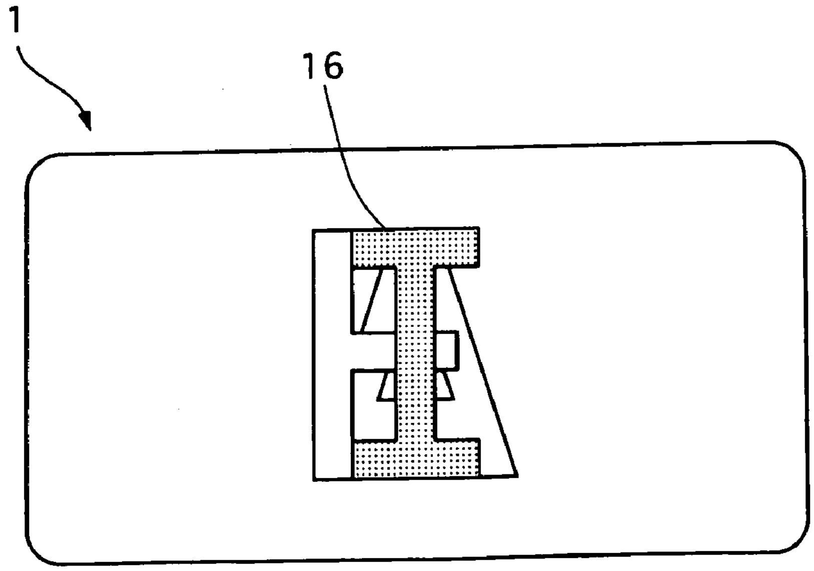
FIG. 18B is a plan view of a display state at that time of the filter through which the third display character "I" appears.

Therefore, the user can see the entire display of the fifth display character "I" in white from the exterior of the switch 1 through the smoked lens 11 as shown in FIG. 18B, where profiles of the third and fourth display characters "A" and "E" are illustrated but can not be clearly seen from the exterior because of the smoked printed area part 10*j* and the smoked lens 11, thereby improving the visual quality.

Incidentally, in stead of using the above-described smoked lens 11 made of ultraviolet light-cuttable material, an ultraviolet light cut area part, made from material capable of substantially blocking the ultraviolet light, may be arranged between the color filter 10 and the user. In this case, the ultraviolet light cut area part may be used with a normal smoked lens, which can not cut the ultraviolet light.

The display device of the second embodiment has the following advantages.

The display device of the second embodiment has the ultraviolet light source 3, the red light source 4, the blue light source 9, the fourth printed area part 10*f* forming the display part of the third display character "A" lo excluding the overlapped parts of the third and fourth display characters "A" and "E" and allowing the red light and the ultraviolet light to pass therethrough and blocking the blue light, the fifth printed area part 10*g* forming the display part of the fourth display character "E" excluding the overlapped parts and allowing the blue light and the ultraviolet light to pass therethrough and blocking the red light, the sixth printed area part 10*h* forming the display part of the overlapped parts and allowing the red light, the blue light, the seventh printed area part 10*i* forming the display part of the fifth display character "I", and the background printed area part 10*d* blocking the red light and the blue light. Therefore, the display device can shiftably display the third display character "A" in red and the fourth display character "E" in blue and the fifth display character "I" in white, where the three display characters are overlapped with each other. The fifth display character "I" can be displayed in color different from that of the filter 10, white, in the first embodiment, which can not be obtained by conventional display devices. This enables the display device to extend freedom degree of display expression.

The display device is provided with the smoke printed area part 10*j*, thereby preventing its interior from being clearly seen from the exterior of the switch 1 to improve its visual quality. In addition, it can suppress effects on displaying other display characters when the display first character is appeared.

The smoked lens 11 can suppress the color light and the ultraviolet light contained in the incoming light and the reflected light. This also prevents the interior mechanism of the display device and profiles of the display characters from being clearly seen by the user from the exterior of the switch 1, providing its good visual quality. In addition, smoked lens 11 can zoom-display the display characters.

The printed area parts 10*a* to 10*i* are obtained at low manufacturing costs by using printing.

Figure 19:
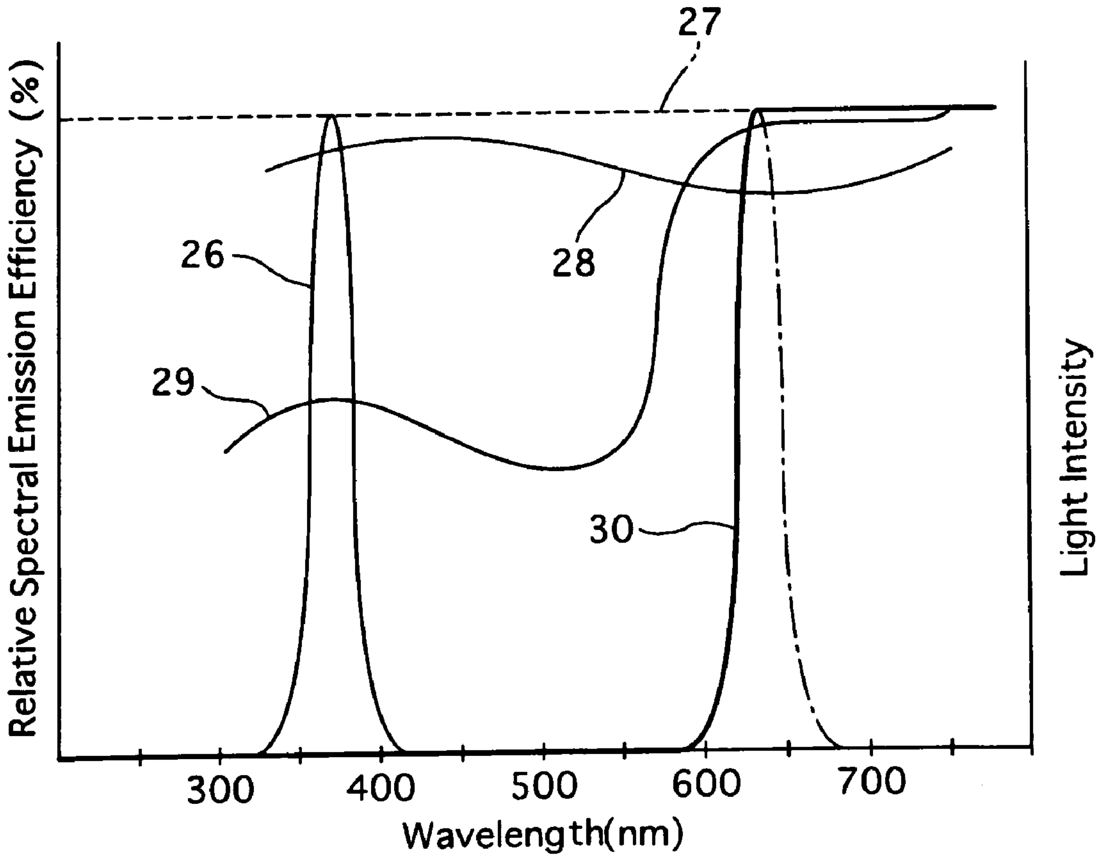
FIG. 19 is a diagram showing a characteristic relationships between wavelengths of ultraviolet printed area parts of the filter and their relative spectral emission efficiency when ultraviolet light hits the ultraviolet light and between wavelength of an ultraviolet light source and its light intensity.

The ultraviolet light source 3 and the ultraviolet printed area part 10*i* can produce the fifth display character in various colors according to need by changing fluorescent material of the ultraviolet printed area part 10*i*. For example, as shown in FIG. 19, the white light can be obtained by using material having a characteristic indicated by a line 28, another color light, such as yellow color, light can be obtained by using material indicated by a line 29, and the red light, similar to that obtained when the red light source 4, can be obtained by using the ultraviolet light source 3 and material indicated by a line 30. Note that the display characters in the same colors, red in FIG. 19, can be obtained by using one of the red light source 4 and the ultraviolet light source 3. This enables the display characters different in contents to be displayed in the same colors by switching the light sources.

Figures 20A, 20B, 20C, 20D, 20E, 20F:
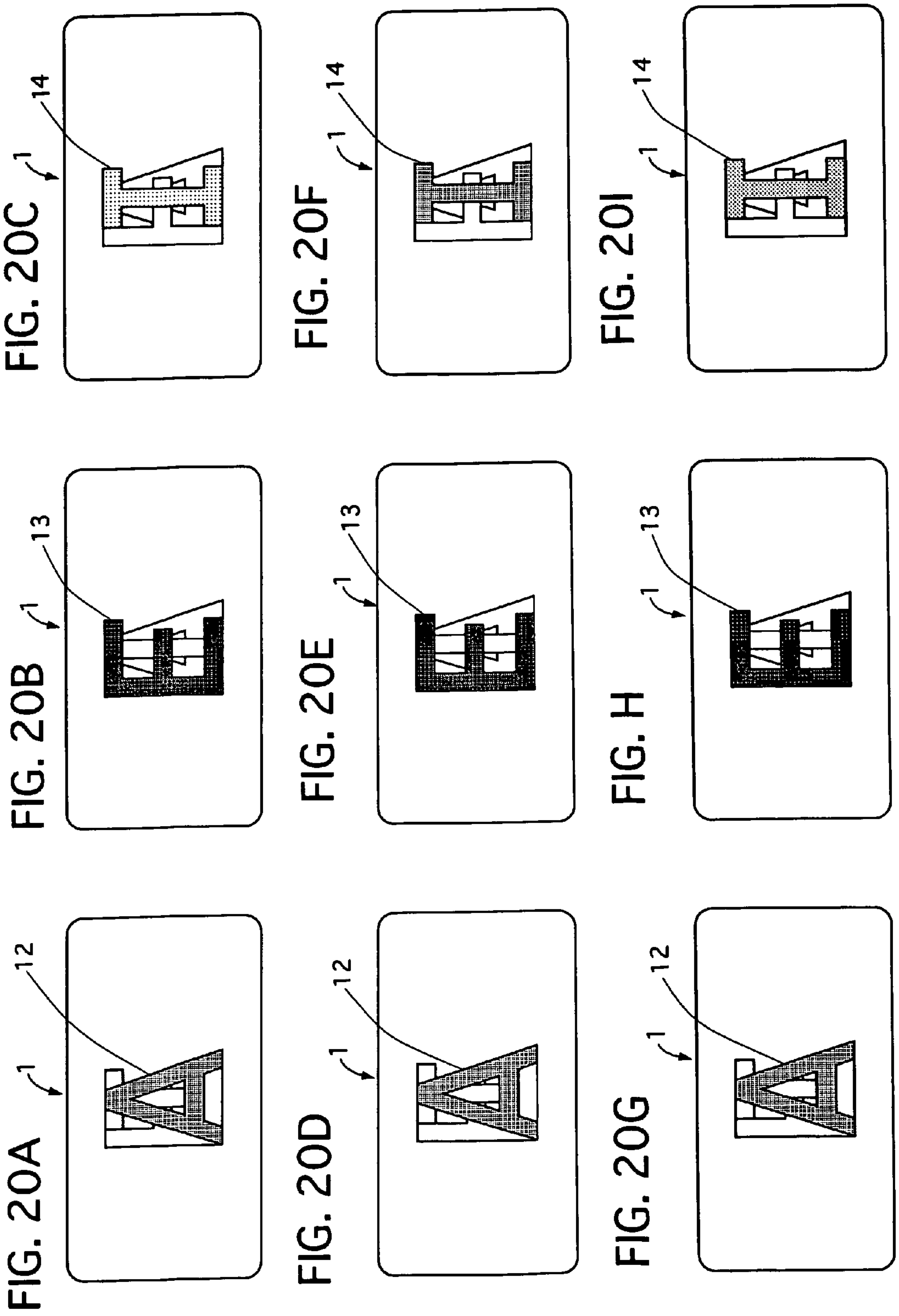
FIGS. 20A to 20C are diagrams showing three display characters "A", "E" and "I" in red, blue and white, respectively.
FIGS. 20D to 20F are diagrams showing them in red, blue and red, respectively.

For example, as shown in FIGS. 20A to 20I, the display characters can be switched in their contents and colors. Left side portions illustrated in FIGS. 20A, 20D and 20G show displays when the red light source 4 is turned on, intermediate portions illustrated in FIGS. 20B, 20E and 20H show displays when the blue light source 5 is turned on, and right side portions illustrated in FIGS. 20C, 20F and 20I show displays when the ultraviolet light 3 is emitted.

When the character "A" is displayed in red and the character "E" is displayed in blue as shown in FIGS. 20A, 20D, 20G, 20B, 20E and 20H, the character "I" is selectable to display in white as shown in FIG. 20C, in red as shown in FIG. 20F, and in yellow as shown in FIG. 20I by changing their fluorescent material.

This change of the character colors may be applied to various sorts of devices, for example an audio device as shown in FIGS. 21 A to 21I.

Figures 21A, 21B, 21C, 21D, 21E, 21F, 21G, 21H, 21I:
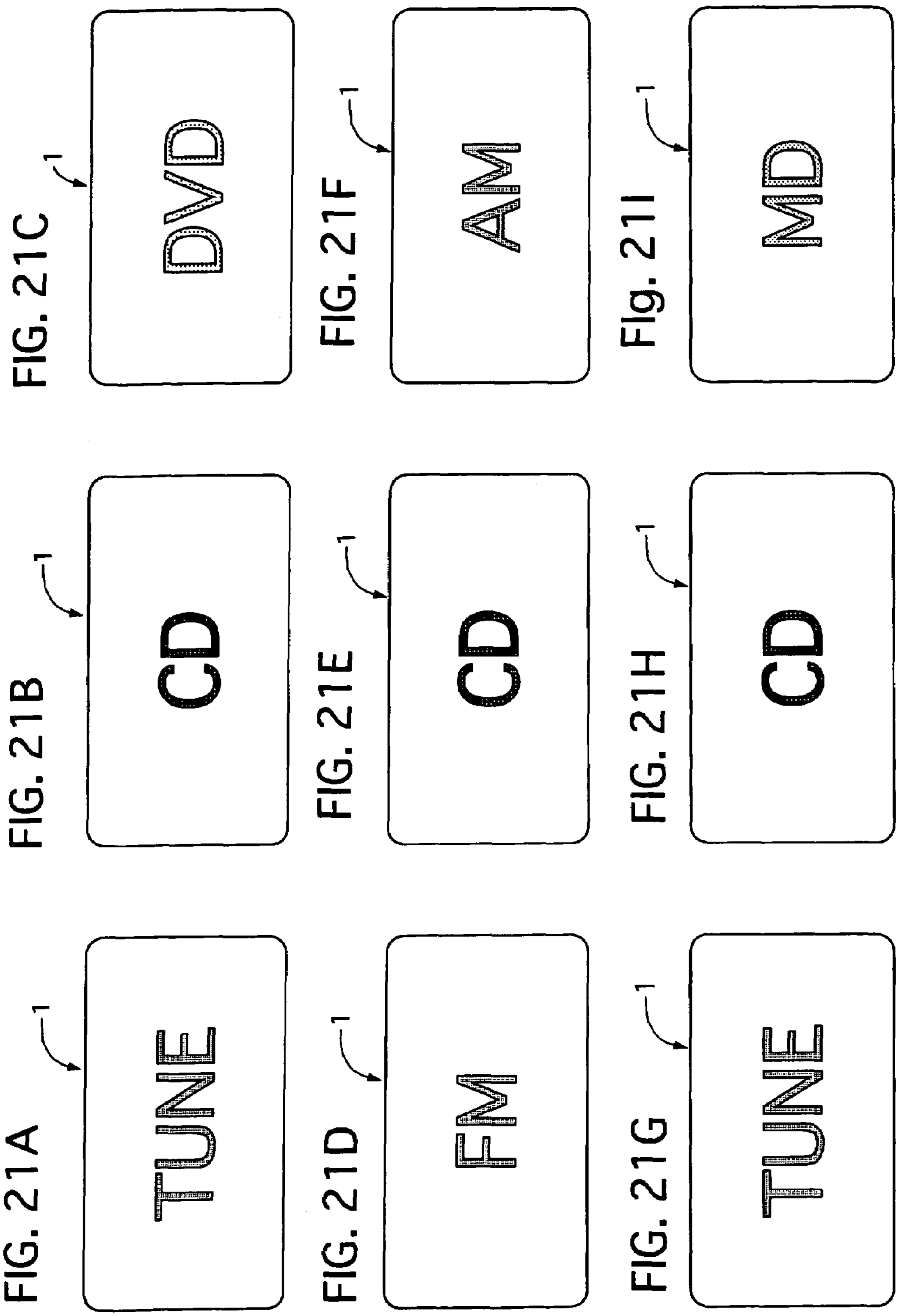

In this device, colors of display contents "TUNE", "CD" and "DVD" can be appeared in red, blue, and white, respectively, as shown in FIGS. 21A to 21C. It is preferable to show different display contents in different colors in order to easily distinguish them.

When similar contents such as "FM" and "AM" are displayable, they can be displayed in the same color, red for example, and other contents "CD" can be displayed in blue as shown in FIGS. 21D to 21F. It is preferable to use the same or similar colors to show the contents "FM" and "AM" which is lower in hierarchy than the contents "TUNE".

Furthermore, display contents "TUNE", "CD" and "MD" can be displayed, for example, in red, blue and yellow, respectively, as shown in FIGS. 21G to 21I.

Therefore, display contents can be displayed in adequate colors according to their contents and/or relations, improving display performance.

While there have been particularly shown and described with reference to preferred embodiments thereof, it will be understood that various modifications may be made therein, and it is intended to cover in the appended claims all such modifications as fall within the true spirit and scope of the invention.

For example, the light sources are set to emit light having peak wavelength of about 500 nm and light having peak wavelength of about 600 nm, but they may use a light source capable of emitting light having characteristics of different peak wavelength, other colors, such as green.

The number of light sources and printed area parts of the filter may be set arbitrarily.

Printed area parts 10*a* to 10*i* may be formed by using any one of silk-screen print making, relief printing, thermal transfer printing, or ink jet printing.

The display contents are not limited to the first to fifth display characters, and may be changed in colors, sizes, contents, and others.

The entire contents of Japanese Patent Applications No. 2005-242015 filed Aug. 24, 2005 and No. 2005-362530 filed Dec. 16, 2005 are incorporated herein by references.

What is claimed is:

1. A display device that is capable of selectively displaying a first display contents and a second display contents where the first display contents and the second display contents have first overlapped parts overlapped with each other, the display device comprising:

an ultraviolet light source for emitting ultraviolet light;

a color light source for emitting color light; and a filter that is arranged in front of the ultraviolet and color light sources so that a rear surface of the filter can be selectively hit by the ultraviolet light and the color light, wherein the filter has a first area part for displaying the first display contents excluding the first overlapped parts when the ultraviolet light is emitted, a second area part for the second display contents excluding the first overlapped parts when the color light is emitted, and a third area part for displaying the first overlapped parts when one of the ultraviolet light and the color light is emitted, wherein the first area part blocks the color light and produces visible light when the ultraviolet light hits the first area part, the second area part allows the ultraviolet light and the color light to pass therethrough, and the third area part allows the ultraviolet light and the color light to pass therethrough and produces visible light when the ultraviolet light hits the third area part.

2. The display device according to claim 1, further comprising a smoke area part arranged in front of the filter so that the smoke area part suppresses brightness of the light.

3. The display device according to claim 2, further comprising an ultraviolet light cut area part arranged in front of the filter.

4. The display device according to claim 3, wherein the ultraviolet light cut area part is made by printing.

5. The display device according to claim 1, further comprising an ultraviolet light cut area part arranged between a smoked lens and the filter.

6. The display device according to claim 5, wherein the ultraviolet light cut area part is made by printing.

7. The display device according to claim 1, wherein at least the first area part and the third area part are made by printing.

8. The display device according to claim 1, wherein the first area part is made of a color filter that blocks the color light and allows the ultraviolet light to pass therethrough and an ultraviolet filter that is arranged in front of the color filter to allow the color light to pass therethrough and produce visible light when the ultraviolet light hits the ultraviolet filter, the second area part is made of a transparent filter allowing the ultraviolet light and the color light to pass therethrough, and the third area part is made of the ultraviolet filter and the transparent filter which are overlapped with each other.

9. The display device according to claim 8, further comprising a smoke area part arranged in front of the filter so that the smoke area part suppresses brightness of the light.

10. The display device according to claim 9, further comprising an ultraviolet light cut area part arranged in front of the filter.

11. The display device according to claim 10, wherein the ultraviolet light cut area part is made by printing.

12. The display device according to claim 8, further comprising an ultraviolet light cut area part arranged between the smoked lens and the filter.

13. The display device according to claim 12, wherein the ultraviolet light cut area part is made by printing.

14. The display device according to claim 1, wherein the color light source has a first color light source for emitting first color light and a second color light source for emitting second color light different from the first color light, wherein the second area part is constructed to be capable of selectively displaying third display contents and fourth display contents which are included in the second display contents to have a fourth area part for displaying the third display contents excluding a second overlapped parts of the third and fourth display contents when the first color light is emitted, a fifth area part for displaying the fourth display contents excluding the second overlapped parts when the second color light is emitted, and a sixth area part for displaying the second overlapped parts when one of the first color light and the second color light is emitted, wherein the fourth area part is made of a first color filter that allows the first color light to pass therethrough and blocks the second color light, the fifth area part is made of a second color filter that allows the second color light therethrough and blocks the first color light, and the sixth area part is made of a transparent filter that allows the first and second color lights to pass therethrough.

15. The display device according to claim 14, further comprising a smoke area part arranged in front of the filter so that the smoke area part suppresses brightness of the light.

16. The display device according to claim 15, further comprising an ultraviolet light cut area part arranged in front of the filter.

17. The display device according to claim 16, wherein the ultraviolet light cut area part is made by printing.

18. The display device according to claim 14, further comprising an ultraviolet light cut area part arranged between the smoked lens and the filter.

19. The display device according to claim 18, wherein the ultraviolet light cut area part is made by printing.

* * * * *